INVENTOR.
RICHARD L. DENNISON
BY Meyer & Peterson
ATTORNEYS

INVENTOR.
RICHARD L. DENNISON
BY
Meyers & Peterson
ATTORNEYS

INVENTOR.
RICHARD L. DENNISON
BY Meyers & Peterson
ATTORNEYS

Dec. 19, 1967 R. L. DENNISON 3,359,551

SYSTEM FOR REMOTELY CONTROLLING THE OPERATION
OF A POWER DISTRIBUTION NETWORK

Filed Jan. 24, 1963 14 Sheets-Sheet 4

INVENTOR.
RICHARD L. DENNISON

BY Meyer & Peterson

ATTORNEYS

INVENTOR.
RICHARD L. DENNISON
BY
Meyers & Peterson
ATTORNEYS

INVENTOR.
RICHARD L. DENNISON
BY Meyers & Peterson
ATTORNEYS

INVENTOR.
RICHARD L. DENNISON
BY Meyers & Peterson
ATTORNEYS

INVENTOR.
RICHARD L. DENNISON
BY Meyers & Peterson
ATTORNEYS

INVENTOR.
RICHARD L. DENNISON
BY Meyers & Peterson
ATTORNEYS

INVENTOR.

RICHARD L. DENNISON

BY Meyers & Peterson

ATTORNEYS

Dec. 19, 1967 R. L. DENNISON 3,359,551

SYSTEM FOR REMOTELY CONTROLLING THE OPERATION OF A POWER DISTRIBUTION NETWORK

Filed Jan. 24, 1963 14 Sheets-Sheet 11

INVENTOR.

RICHARD L. DENNISON

BY Meyers & Peterson

ATTORNEYS

INVENTOR.
RICHARD L. DENNISON
BY Meyers & Peterson
ATTORNEYS

INVENTOR.
RICHARD L. DENNISON
BY Meyers & Peterson
ATTORNEYS

INVENTOR.
RICHARD L. DENNISON
BY Meyers & Peterson
ATTORNEYS 3,359,551

SYSTEM FOR REMOTELY CONTROLLING THE OPERATION OF A POWER DISTRIBUTION NETWORK

Richard L. Dennison, Minneapolis, Minn., assignor to Magnetic Controls Co., Minneapolis, Minn., a corporation of Minnesota Filed Jan. 24, 1963, Ser. No. 253,537
26 Claims. (Cl. 340—310)

ABSTRACT OF THE DISCLOSURE

A system for controlling the operation of a power distribution network is provided in which signals are transmitted over power lines to a plurality of receivers which perform electrical circuit connections and disconnections in response to the received signals. The signals contain address and command information so that a predetermined receiver location is selected in response to the address portion and a predetermined function is performed in response to the command portion.

This invention relates generally to a load control system for electric power distribution lines, and pertains more particularly to a system for controlling load conditions at their locations from a remote vantage point through the agency of appropriately processed digital signals transmitted via the power lines themselves.

Electric utility companies are constantly confronted with the problem of providing adequate service for their customers. Naturally there are peak load periods, some of which can be predicted and some of which can not, but nonetheless adjustment for which must be made in each instance. It is therefore an object of the invention to provide a type of load control that at any needed time will satisfactorily and reliably decrease the overall load connected thereto to the extent necessary to maintain system stability. Thus, the invention has for an aim the better utilization of generation, transmission and distribution facilities in the handling of electric power loads.

Another object is to provide for controlling the power requirements on a selective basis without having to deenergize an entire feeder line, it being within the purview of the invention to drop loads of different classes or types while continuing to supply power to more essential loads. For instance, a power company may decide that all water heating loads should be dropped or disconnected on a particular distribution feeder before, say, home heating or air conditioning loads are dropped. Various priority schedules are of course possible and provision is made for interlacing the control signals that are transmitted so that a relatively large number of load classifications can be selectively dropped should circumstances so dictate.

Another object of the invention it to permit resumption or reconnection of the various loads as soon as the operating conditions warrant. Actually, it is planned that reconnection of a particular load or groups of loads take place automatically when the dispatcher, or automatic supervisory equipment as the case may be, has determined that the distribution system can safely handle the additional load. Stated somewhat differently, the invention has for an aim the provision of a system in which positive action must be taken to disconnect a load, but which passively permits the reconnection to occur when the positive action is terminated. More specifically, it is intended that control pulses be transmitted to receiving equipment associated with a load in order to drop the load, and that a cessation of these pulses for a certain period will permit the disconnected load to be immediately reconnected without sending out any special signals.

Associated with the preceding object is a further object which is to permit a random resumption of load conditions. For example certain receivers can possess desired time delay characteristics, and these characteristics can be made to differ from receiver to receiver or from one group of receivers to another. Accordingly, the load resumption need not be sudden but can be achieved on a gradual basis for a given load classification. In addition, different classes of loads can be readily staggered with respect to their reconnection, thereby further contributing to the smoothness of load resumption.

A further object is to provide a load control system that is completely compatible with existing power transmission and distribution schemes, the present invention requiring but a minimum of modification to existing systems. Actually, the contemplated control system necessitates only what amounts to a superimposing of additional equipment on a conventional power system rather than any real or basic alteration thereof.

The invention has for another object the provision of a digital transmission system wherein information signals include both an address code and a command code, these codes being transmitted in a serial fashion to various transmitters located at different substations. However, owing to the presence of the address code and appropriate means at the transmitter of a given substation for ascertaining whether the information signals are intended for transmission from that particular substation, the system envisioned by the present invention provides for a comparison between the received address code and that particular code assigned to the particular transmitter and if the message is not intended for that substation, then the load control system of the instant invention will reject the entire message and there will be no transmission thereof onto the distribution lines served by that substation. On the other hand, the substation that has been assigned the particular address will receive the information signals and forward appropriate signals onto its power lines so that the appropriate receivers will be energized and an intended load reduction consummated by the disconnecting of individual loads.

Yet another object is to provide a load control system that will not interfere with other equipment energized by the power system.

A still further object of the invention is to provide a system for controlling load conditions that will not be adversely affected in its functioning by transient and ambient noise signals.

Also, the invention has for an additional object a system of the foregoing character that will require a low average power level, even though the system possesses the ability to drive through distribution power transformers without the need for by-pass circuits.

*Introductory description of the invention*

Quite briefly, the load control system constructed in accordance with the teachings of this invention involves the processing of certain command and address signals in a digital form at one of a number of locations, the particular location being determined by the address signals. The transmitter at the selected location will then employ derivatives of these signals that have been forwarded to this particular transmitter and will produce predetermined sequences of relatively high frequency carrier bursts that are fed to a power transmission or distribution line in an interlaced manner. Tuned receivers at the other end of the line discriminate between these pulses, accepting only those having a carrier frequency for which the particular receiver is tuned. A sufficient number of pulses is provided in each group of pulses to cause receiver energization with a concomitant load disconnection for as long as bursts of the appropriate carrier frequency are received; when no more pulses or bursts of a particular frequency are received by a given receiver during a prescribed interval, then the load controlled by that receiver is automatically reconnected to the distribution line.

These and other objects and advantages of this invention will more fully appear from the following description, made in connection with the accompanying drawings, wherein like reference characters refer to the same or similar parts throughout the several views and in which:

*General description of the system*

Figure 1:
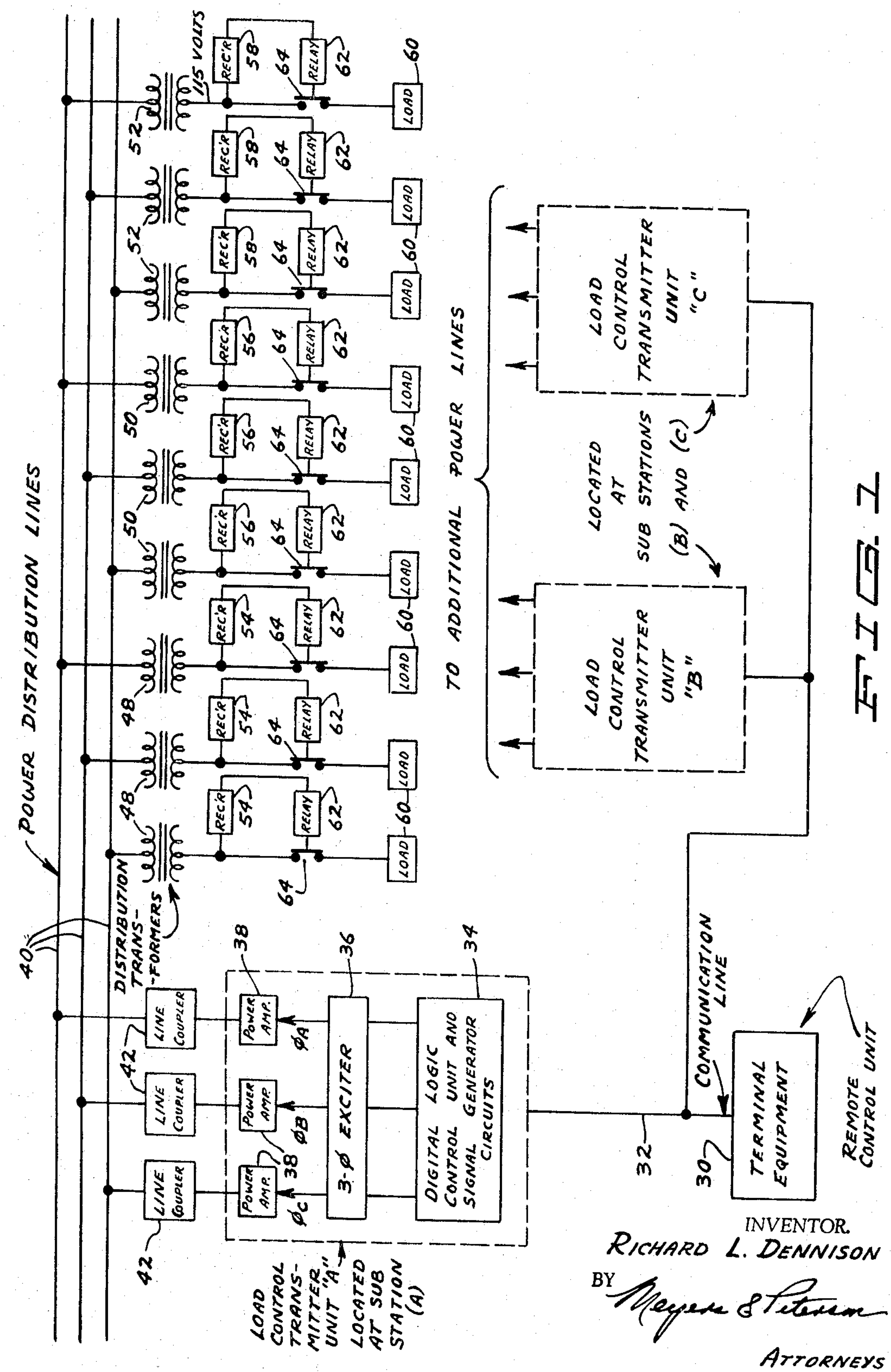
FIGURE 1 is diagrammatically illustrative of a portion of a conventional power distribution system equipped with a load control transmitter and several receivers at the load end of the distribution lines, there being two additional transmitters serving other distribuion lines.

For a basic understanding of the invention, reference should initially be made to FIGURE 1. As is evident from this figure, a remote control unit 30 involving certain terminal equipment has been indicated. This terminal equipment is located at some central station such as in the load dispatcher's office. While the specific type of terminal equipment does not constitute an integral part of the invention, nonetheless it is of importance to appreciate that such equipment is utilized for the purpose of forwarding digital instructions via a communication line 32 which would normally constitute a telephone circuit although in some instances a microwave system might be more suitable. As the description progresses, it will be appreciated that the terminal equipment may, for example, include a punched or magnetic tape unit which sends forth over the communication line the needed instructions.

In the illustrated situation, FIGURE 1 shows three load control transmitter units A, B, and C. For the sake of discussion, the load control unit A can be considered to be located at one substation (A) and the other units B and C located at other substations (B) and (C). The communication line would be connected to all three load control transmitter units A, B and C. It will of course be understood that a much larger number of transmitter units can be employed and would normally be used in actual operation.

Solely for the purpose of presenting an early idea as to the role played by a given transmitter unit, it will be pointed out that the transmitter unit A, which is identical to the units B and C, includes a section that contains a digital logic control unit and various signal generating circuits, this section being designated by the reference numeral 34. Also included in the rather abbreviated construction of the transmitter unit A, as shown in FIGURE 1, is a three-phase exciter 36 and several power amplifiers 38, there being one for each of the three phases. Should more detailed information concerning the exciter and power amplifiers be desired at this time, reference can be made to FIGURES 17 and 18, respectively. Although not evident from the description thus far presented, it can be said at this time that the output from the power amplifiers is in the form of bursts of power of different carrier frequencies, there being a different carrier frequency for each class of receiver that is to be controlled by the transmitter unit A. A specific number of carrier frequency bursts will be produced in each instance to form what can be considered to be a group of power bursts intended for one class of receivers, there being subsequent bursts of different frequencies for other receiver classes. These various groups of bursts are forwarded from the outputs of the power amplifiers and are superimposed upon the 60-cycle frequency of the power lines.

Since the transmitted signals or bursts from the power amplifiers 38 are to be coupled to three-phase, 60 cycle, relatively high voltage (12.5 kv.) power distribution lines 40, some means of isolating the high voltage of these lines from the amplifiers must be used. The couplers or filters 42 shown in block form in FIGURE 1 each consists of six iron core inductances 44*a, b, c, e, f* and six capacitors 46*a, b, c, d, e, f*, as shown in FIGURE 4, of sufficient voltage rating for the voltage supplied to the distribution lines. The combination of the inductance and capacitance provides a series resonant condition at each of the transmitted signal frequencies which is easily passed to the power distribution lines 40. However, the 60-cycle electric power sees a very high impedance at these couplers 42 and is thus prevented from reaching any of the power amplifiers 38. Consequently, as far as the lower power frequency is concerned, the transmitter unit A, as well as the other transmitter units B and C, is safely isolated therefrom.

The power distribution lines 40 quite naturally are of indefinite length and constitute but one feeder of a more complex power grid. However, their purpose is to distribute power to various distribution transformers located at various points therealong. It is at these transformers that the voltage is stepped down from a relatively high value to a usable value such as the customary 115 volts that is used to service domestic connections. For the sake of drafting simplicity, only three sets of distribution transformers 48, 50 and 52 are depicted, but it will be appreciated that a relatively large number may be employed. Associated with each of the single-phase transformers 48 is a receiver 54 which will be described more fully when discussing FIGURE 19. Additional receivers 56, 58 are associated with the transformers 50, 52. It will be seen that each receiver 54–58 is employed for disconnecting a single-phase load 60 that is normally connected to the lines and does so through the instrumentality of a relay 62 having normally closed contacts 64 which merely open the circuit to the load connected to the particular transformer with which that receiver is associated. It will be understood that the receivers 54 in FIGURE 1 will all be tuned or responsive to a given carrier frequency transmitted via the distribution lines 40 and the receivers 56, 58 will be tuned to different frequencies. Thus, the load control transmitter unit A will transmit receiver signals on various channel frequencies and it will be only those receivers that are intended to dump their loads that will respond to the burst-type signals so transmitted. Consequently, the load control system described so far is capable of selecting certain receivers and causing such receivers to disconnect the loads that are controlled thereby.

*General description of load control transmitter*

Figure 2:
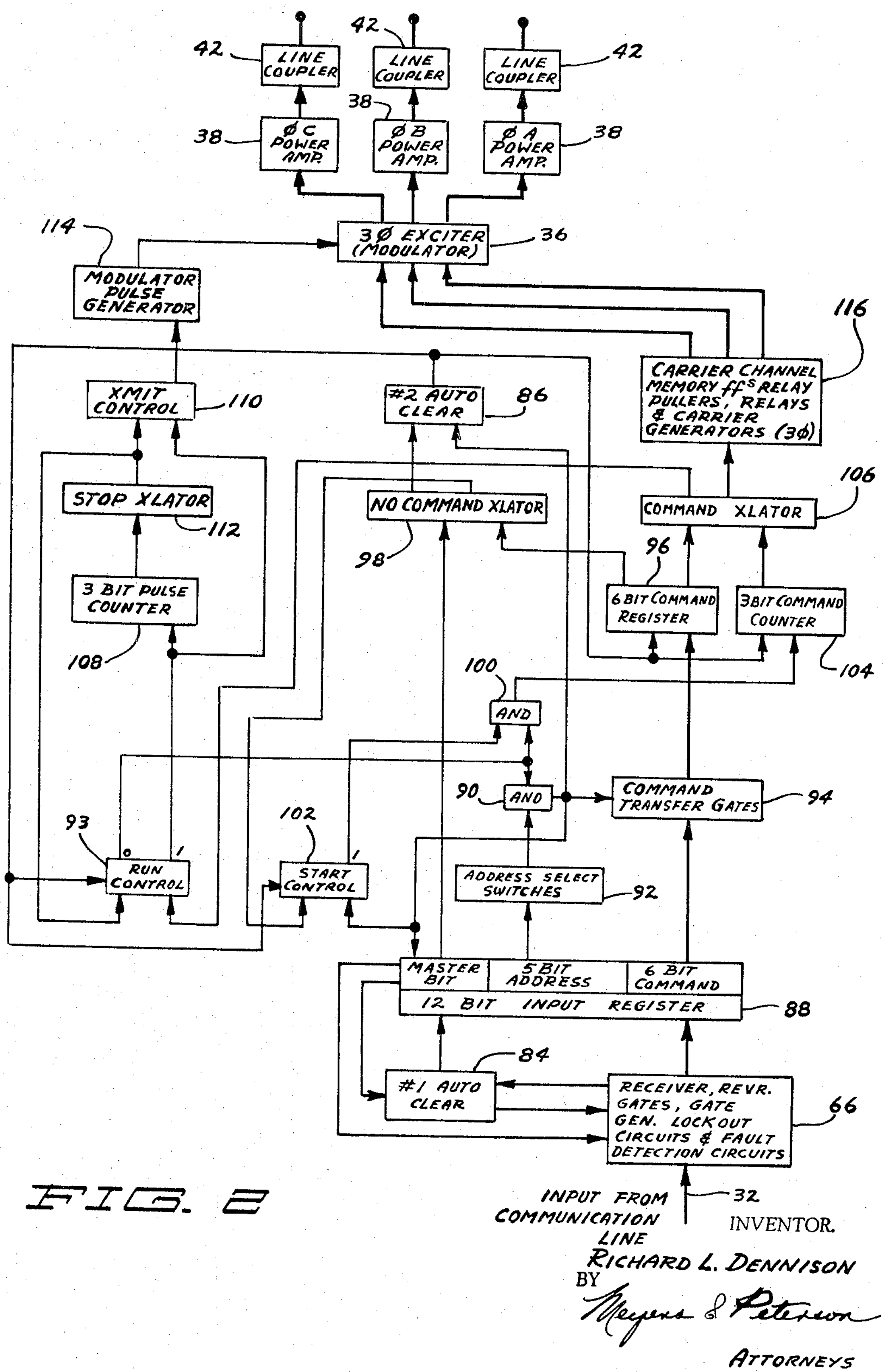
FIGURE 2 is a block diagram of one of the load control transmitters, this view being presented to give a general idea of the more basic components employed in the construction of a transmitter.

At this time a general description of the load control transmitter A will be given and reference should be made to FIGURE 2 in conjunction with the ensuing description. Since FIGURE 2 constitutes a simplified representation in block form, it will be appreciated that a single conductor or line may represent a multiple number of conductors or lines and allied circuitry. In FIGURE 2 only a portion of the communication line 32 of FIGURE 1 is shown, it being recalled that this line functions as a data link with the terminal equipment constituting the remote control unit 30. From FIGURE 2 it will be observed that the communication line 32 leads into what has been termed an input control 66, more fully treated in discussing FIGURE 4. The input control 66 embraces a number of components and included among these components is a receiver, two receiver gates, a generator performing a blanking function, lock-out circuits and several fault detection circuits, these circuits constituting an important portion of the circuitry that has already been collectively referred to by the numeral 34. These circuits are referred to more specifically in conjunction with FIGURE 4 and their specific elements in certain instances are even more specifically detailed in some of the schematic diagrams that has been included.

Figure 3:
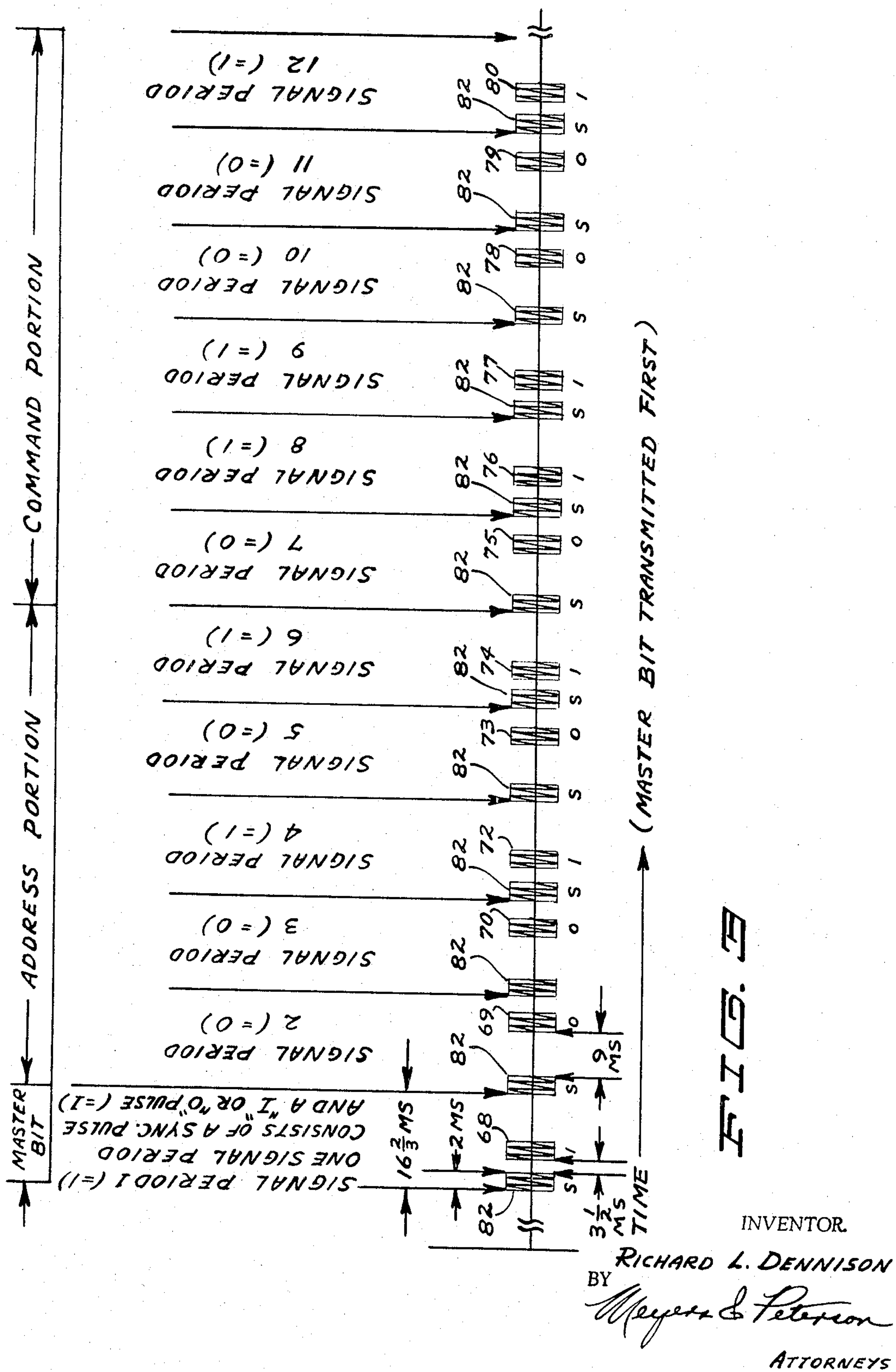
FIGURE 3 is a pulse pattern representing the digit sequence that is delivered to the various transmitters, the particular word that has been selected having certain synchronizing pulses superimposed upon the pattern which synchronizing pulses assure a proper handling of the digital information within the transmitter.

The terminal equipment or remote control unit 30 sends out an instruction word over the communication line 32. This is received at the load control transmitter A as well as at the load control transmitters B and C. At this time it will be well to examine such a word which is of considerable importance because of the information it carries. In this regard, attention is drawn to FIGURE 3 where the binary word 100101011001 is graphically pictured. In other words, the instruction word includes a total of 12 binary digits or bits. These various bits, as shown, still contain the carrier frequency utilized in their transmission from the remote control unit 30 and have been assigned various reference numerals 68–80 in the bit order set forth above. The word can be broken down into what will be referred to as a master bit, this being the bit denoted by the numeral 68 and an address portion 00101 composed of the pulses 69–74 which represents a binary 5 and is to be considered as being the address of the load control transmitter A, and a command portion composed of the pulses 75–80 having the binary notation 011001. The various bits represented in FIGURE 3 are transmitted in a serial fashion with the master bit being transmitted first. In the form shown, it can be discerned that each bit constitutes a pulse composed of the particular carrier frequency that is used in forwarding the information over the communication line 32, as indicated above.

Also shown in FIGURE 3 is a plurality of synchronizing or sync pulses labeled 82. Close inspection of this particular figure will reveal that there is a sync pulse that appears just before each bit of the word 100101011001. Although not apparent at the moment, the function of the various sync pulses is to condition the input control 66 for the reception and appropriate processing of the binary word 100101011001.

Whereas the digits 00101 represent the address portion of the instruction word, the digits 011001 represent the command portion and it can be explained at this time that the command portion of the instruction word is interpreted somewhat differently from the address portion. What happens is that the command portion 011001 is construed as requiring that three channels be utilized for the transmission of information to the various receivers 54, 56 and 58. Reading the command portion 011001 from right to left, it would mean that signals are to be transmitted on channels 1, 4 and 5 called for by the pulses 80, 77 and 76, inasmuch as "0's" have been assigned to channels 2, 3 and 6 represented by the pulses 79, 78 and 75. Of course, the particular channels that have been selected are only of an exemplary nature, for there are six bits in the command portion and in this particular situation as many as six channels could be selected for transmission purposes. Merely by enlarging the content of the command portion still additional channels can be serviced. However, the number that has been selected is representative and will serve as an adequate means for illustrating which can be achieved with a load control system of the envisaged type.

Still referring to FIGURE 3, it will be seen that the message or instruction word received by the transmitter A (and also the transmitters B and C) is broken up into 12 discrete signal periods. Each signal period includes a sync pulse which has been given the reference numeral 82 and a pulse representative of a binary "1" or "0" as denoted by the pulses 68, 72, 74, 76, 77, 80 and the pulses 69, 70, 73, 75, 78, and 79, respectively. The sync pulses 82 are uniformly spaced in time, there being one during each 16⅔ millisecond, assuming that they are derived from a 60-cycle source. The sync pulses are of only 2 milliseconds duration and after each there is a 3½ millisecond hiatus where there would never be any pulse. However, when a 1 bit is to be included in the time period, then at the end of the 3½ millisecond hiatus a 2 millisecond pulse would appear to indicate a binary 1. On the other hand, where only a binary 0 is to be represented, then there would be a 9 millisecond hiatus or delay before the arrival of a pulse denoting a 0 bit. This situation is adequately represented, it is believed, in the various time periods set forth in FIGURE 3.

Having prefaced the description of FIGURE 2 with the foregoing information, it can now better be appreciated that the various bursts constituting the word 100101011001 will be serially received by the input control where the bursts are rectified and the carrier frequency filtered out so as to produce a discrete pulse for each burst of carrier that arrives from the terminal equipment or remote control unit 30. At this time, the input control 66 makes no effort to differentiate between sync pulses, 1 pulses and 0 pulses. This will be done later in the circuit as will appear from the following description. At the moment, the receiver portion of the input control 66 does only what has been referred to in this particular paragraph.

Inasmuch as flip-flop circuits are quite conventional, it will be assumed for the time being that their operation is well understood. However, reference will later be made to FIGURE 14 and a somewhat more specific description of a typical flip-flop circuit will be given at that time. All that is neccessary for the moment is to appreciate that a flip-flop circuit is one having two stable states. Two input terminals are associated with each flip-flop circuit which are regarded as a set or 1 terminal and a reset or 0 terminal. The output terminals represent either a binary 1 or a binary 0. Accordingly, these Boolean tags have been applied to the two output terminals of each flip-flop utilized in the load control transmitter.

Having generally alluded to the existence of flip-flops, it can be pointed out that there are two flip-flop circuits that are responsible for initially clearing all registers of their contents and also resetting other flip-flops. These flip-flops have been termed #1 auto clear circuit 84 and #2 auto clear circuit 86 (FIGURE 2).

Thus, when the information starts coming in in the form of the binary word 100101011001, each bit being preceded by a sync pulse 82, all flip-flops in the transmitter are reset or cleared to 0. This includes a 12-bit input register 88, twelve bits having been selected because of the twelve bit word. The 12-bit input register 88 performs two functions: (1) It serves as a twelve bit buffer register and therefore staticizes or stores the eleven significant bits that will later be translated out and used for address checking purposes and also for channel command purposes; (2) It functions as a twelve bit ring counter, for the master bit 68 is progressively shifted to the left across the register until it hits the master bit position at the extreme left, thereby performing certain lock-up functions and conditioning the circuitry for subsequent transfer operations. After "ringing" down the input register, the master bit 82 hits the last position at the left and causes the input register 88 which is functioning as a ring counter to shut itself off. This is the purpose of the master bit 82, inasmuch as it is not used for address or command functions.

As stated above, the #1 and #2 auto clear circuits 84, 86 cause the various registers and control flip-flops to be reset to their 0 state. After this has occurred, the first pulse to come into the input control 66 is the sync pulse 82 that immediately precedes the master bit pulse 68. The input control 66 will interpret this pulse as being a sync pulse and if it should happen to be a noise or random pulse, a fault would be registered, as will become manifest when considering FIGURE 4.

For the moment, we will assume that the input control 66 interprets the first pulse as a sync pulse and it is sent up to the input register 66 via certain shift gates associated therewith which appear in FIGURE 4 and causes a left shift operation to be performed. It also causes certain control functions to be carried out within the input control 66 and these control functions will have to await a description of FIGURE 4 before they become completely understandable. However, at this time it can be pointed out that the sync pulse does lock out the #1 auto clear circuit 84, which means that the #1 auto clear circuit is reset to its 1 state. To prevent a clearing of the input register 88 the #1 auto clear circuit 84 must be locked out and this is accomplished by the first sync pulse. As indicated above, the first sync pulse performs various control functions within the input control 66 and these functions result in the interpretation of the next pulse as being either a 1 or a 0.

It will be recalled that the master bit 68, this being the first pulse after the first sync pulse 82, is a 1 and it will be processed as such. Since the input register 88 was initially cleared to 0, the first sync pulse that caused a left shifting only shifted 0's. Therefore, when the master bit 68 arrives, it will be sent into the input register and sets the first flip-flop stage thereof to 1, although the other eleven stages remain in their 0 state. The receipt of the master bit, that is, a 1, will clear certain lock-outs within the input control 66 and also will function to hold the #1 auto clear circuit 84 in its 1 or locked out state.

The main thing to appreciate is that the receipt of the master bit does perform other control functions and in the process of doing so paves the way for the interpretation of the next pulse as a sync pulse. When the second sync pulse 82 arrives, it performs the same operations as the previous or first sync pulse. In other words, it performs a left shift operation on the input register and also holds the #1 auto clear circuit 84 in its 1 or locked out condition. As with the first sync pulse, the second sync pulse also conditions the input control 66 so that the next pulse delivered will be interpreted as either a 0 or a 1. Accordingly, when the second sync pulse has shifted the input register 66 to the left, as indicated above, the contents of this register will then be 000000000011.

It may be helpful at this time to re-examine FIGURE 3. It will be seen from the temporal pulse sequence that the second sync pulse 82 is to be followed by the 0 pulse 69. It is to be observed that the 0 pulse 69 following the second sync pulse is later in point of time than the 1 pulse 68 was with rescept to the first sync pulse 82. More specifically, the 0 pulse 69 following the second sync pulse 82 will arrive after a 9 millisecond lapse.

At any rate, the 0 pulse 69 following the second sync pulse 82 is forwarded to the input stage of the twelve bit input register 88 and sets the input stage back to 0. It also has the effect of holding off the #1 auto clear circuit 84 so that it does not perform a clearing function. Still further, it conditions the input control 66 so that it is then set to receive another sync pulse 82.

The same sequence described above continues until twelve bits of information are placed in the input register 88. By way of review, it will be recalled that the twelve bits of information, a twelve bit instruction word having been selected, is composed of the master bit, five bits of address and six bits of command. In other words, the word 100101011001 is now to be considered as being stored in the input register.

It is important that a master bit, that is, a 1, be shifted into the master bit portion of the input register 88. Inspection of FIGURE 2 will reveal that there is a line leading from the master bit portion of the register 88 down to the input control 66. The forwarding of a signal from the master bit portion has the effect of locking out the input control 66 so that it cannot receive any more information from the communication line 32. In other words, only twelve bits of information can be received in the exemplary situation and these twelve bits are retained in the input register 88, the whole system being locked out as far as the receipt of any additional digital information is concerned.

In addition to locking out the input control 66, the master bit portion of the input register 88 forwards a signal to the #1 auto clear circuit 84. The master bit permanently, or more precisely, indefinitely locks out the #1 auto clear circuit.

Still further, the master bit portion of the input register 88 is connected to one input of a diode type AND circuit 90. The AND circuit 90 has a second input connected to a bank of five address select switches collectively identified by the reference numeral 92. It can be pointed out at this time that these switches are individually set for the particular address that has been assigned to the substation that is to become active in sending out information to be picked up by designated receivers. In this situation, the addresses would be set so as to correspond to a binary 5. The third input of the AND circuit 90 is connected to the 0 side of a run control flip-flop circuit 93.

In order to simplify the description of FIGURE 2 as much as possible, the source of clock pulses have not been shown. However, when the AND circuit 90 has all three of its inputs activated a clock pulse would be instrumental in causing an output from this particular AND circuit.

The output from the AND circuit 90 is responsibile for opening a group of command transfer gates 94 which transfer the contents of the command portion of the input register 88 to what has been termed a 6-bit command register 96. The 6-bit command register 96 acts as a holding register for the command portion of the instruction word.

FIGURE 2 shows that there is a line leading from the output of the AND circuit 90 to the master bit portion of the input register 88, and such a connection causes the last stage of the input register 88 to be cleared back to 0, thus allowing the #1 auto clear circuit to clear out the rest of the input register constituting its 5-bit address portion and its 6-bit command portion. In other words, the entire input register 88 is reset to its 0 state. It will, however, be appreciated that the twelve bit instruction word has served its purpose, inasmuch as the usable portions of this word have now been translated out of the 5-bit address portion and also the 6-bit command portion of the input register 88. Although the six bit command is held in the 6-bit command register 96, there is no holding or retention of the five bit address portion of the word because only a checking operation is necessary in order to ascertain whether the particular transmitter A is the transmitter that is to process the instruction word that we have been concerned with.

It will also be discerned that the output from the AND circuit 90 is connected via a line extending to the #2 auto clear circuit 86. Hence, the same clock pulse that was instrumental in transferring the six bit command to the 6-bit command register 96 also acts in a manner to set the #2 auto clear circuit 86 to its 1 state, thereby shutting off any further supply of clearing pulses from the auto clear #2 circuit. It is to be noted that a no command translator 98 is connected to the 6-bit command register 96 and that this no command translator is in turn connected to the #2 auto clear circuit 86. Consequently, if a 1 is placed in any of the six bit positions of the 6-bit command register 96, the #2 auto clear circuit 86 will stay in its 1 state. If nothing was transferred into the 6-bit command register 96, then naturally it would have contained all 0's and the 0's would be responsibile for actuating the no command translator 98 so as to switch the #2 auto clear circuit 86 into its 0 state to inaugurate a clearing operation.

However, in the situation at hand, we have stored a binary 011001 in the 6-bit command register 96, which word portion contains three 1's. It will also be noted that the condition of the master bit portion of the input register 88 is connected to the no command translator 98, thereby determining when the no command translator is to consider what is stored in the 6-bit command register 96. At any rate, from what has been said, it will be apparent that under the assumed set of circumstances the #2 auto clear circuit 86 will not operate to clear out the various flip-flop circuits under its supervisory control. Should it be desired to stop the load control transmitter A, then the instruction word could be modified so as to contain six 0's in its command portion and it will be understood that everything will be cleared, including the flip-flop circuits under the control of the #2 auto clear circuit 86.

It will be recalled that the run control flip-flop circuit 93 is in its 0 condition, this having been the case in causing the command transfer gates 94 to translate the six bit command to the 6-bit command register 96. Also connected to the 0 side of the run control flip-flop circuit 93 is one input of a second AND circuit 100 which when it has its second input activated from the 1 side of a start control flip-flop circuit 102 permits clock pulses to go to a 3-bit command counter 104. It is only necessary to appreciate that the 3-bit command counter 104 will run until it reaches a coincident condition with the 6-bit command register 96, this being accomplished through the agency of a command translator 106. More specifically, when the command counter 104 starts running it will count until it reaches a binary count corresponding to the first position that it encounters as far as the 6-bit command register 96 is concerned. In other words, inasmuch as a 1 is stored in the first stage of the 6-bit command register 96, the counter will count to 1 and will stop. It always stops on a coincident count.

It will be noticed that a line can be traced from the command translator 106 to the 1 input terminal on the run control flip-flop circuit 93. What occurs is that the command translator when ordered to do so by the coincidence mentioned above will set the run flip-flop circuit 93 to its 1 state. Such a happening will in turn lock out the command counter 104 by precluding additional clock pulses from reaching this counter via the AND circuit labeled 100.

However, the switching of the run control flip-flop circuit 93 to its 1 state will initiate operation on a 3-bit pulse counter 108 and concurrently with this operation switches a transmit control flip-flop circuit 110 to its 1 state. The output from the 3-bit pulse counter 108 is also delivered to the transmit control 110, in this case the 0 input side thereof, such a feeding action taking place through what has been termed a stop translator 112. The stop translator 112 is wired for octal 7, all of which means that the 3-bit pulse counter will count to 111 (octal 7) and in the process will cause seven clock pulses to trigger a modulator pulse generator 114 seven times. The generator 114 is connected to the three-phase exciter 36 and causes the exciter to be in turn triggered into operation seven times. Each time the exciter 36 is operated it passes a three-phase carrier signal generated by one of certain oscillators and associated components contained in the block represented by the reference numeral 116 which provides a carrier frequency power burst for each of the power lines 40. This block 116 is of course controlled by the command translator 106 so that successive carrier signals of different frequencies are presented to the three-phase exciter 36. It will be remembered that any one of six channels can be used, each channel being provided with a different carrier frequency.

As soon as the stop translator 112 has reached the octal seven count that was previously alluded to, the translation is completed and the transmit control 110 is returned to 0 and remains in its 0 state until a succeeding group of seven triggering pulses for the modulator pulse generator is desired.

Concomitantly with the completion of the stop translator 112 is a resetting of the run control flip-flop circuit 93 to its 0 state, this being by way of a line extending downwardly from the output of the stop translator 112 to the 0 input terminal of the run control flip-flop circuit. When the run control flip-flop circuit 93 is reset to its 0 state, both inputs that have been shown associated with the AND circuit 100 are energized, the other input being connected to the 1 side of the start control flip-flop circuit 102. This state of affairs causes the AND circuit 100 to inaugurate another counting operation as far as the 3-bit command counter 104 is concerned, for clock pulses are then permitted to pass to the 3-bit command counter and the first one will start the counting operation again.

The 3-bit command counter 104 merely counts until it reaches another coincident condition with the 6-bit command register 96, this being again in conjunction with the command translator 106. When such a coincident condition is established, then the command counter will again stop but on a binary count represented by the coincident condition. This paves the way for the forwarding of a different carrier frequency signal from the circuitry generally designated by the reference numeral 116 which is delivered to the three-phase exciter 36.

Once again the establishment of a coincident condition as far as the command translator is concerned causes the run flip-flop circuit 93 to be set to its 1 state and this 1 state condition causes the 3-bit pulse counter 108 to start counting again. It will gate out seven clock pulses, as it did in the first instance, these pulses being forwarded to the modulator pulse generator 114 to provide the desired number of power bursts for the lines 40 (FIGURE 1) via the three-phase exciter 36, the three-phase carrier signal being delivered from the block denoted by the numeral 116.

It might be well at this point to assume a somewhat different command signal. It will be recalled that the one selected was 011001 which calls for a transmission on channels 1, 4 and 5. To demonstrate the versatility of the system, it will now be assumed that the command portion of the instruction word contains all 1's. This in turn means that the 3-bit counter 104 will only advance one count at a time. In other words, it will count to a binary 001, then to 010, then to 011 and so on, a group of seven pulses being generated so as to control the modulator pulse generator 114 as explained in the previous paragraph. All that the 3-bit command counter 104 does, then, is to count clear around and when it does not see any more bits in the 6-bit command register 96 it comes back to its 0 initial state. In effect, what is being done by this cycling type of operation is that the various channels over which transmission is to occur are being interlaced with each other. Stated slightly differently, the command counter 104 will count to a coincident count and then stops while the pulse generator 114 puts out seven more pulses on the selected channel. It then proceeds to count again and stops at the next coincident count so that seven more pulses are put out onto the power lines 40.

In essence, what the system does is to continue to operate as long as there is a 1 bit in at least one stage of the 6-bit command register 96. If the system is to be inactivated or stopped, then a new instruction word must be forwarded to the input control 66 via the communication line 32. The new word must contain all 0's in its command portion. In other words, the instruction word would read 100101000000. The previously described sequence would result in these 0's being transferred into the 6-bit command register 96 and when this occurs, then there would be no output to the no command translator 98 and the #2 auto clear circuit 86 would c'ear all of the flip-flops back to their 0 condition and this particular transmitter A would thus be turned off.

*Specific description of load control transmitter*

The foregoing description has dealt with the block diagram set forth in FIGURE 2. It is believed that the presentation of FIGURE 2 has been of assistsance in providing a basic understanding of the manner in which the load control transmitter functions. Inasmuch as the block diagram of FIGURE 2 is of necessity quite abbreviated, reference will now be made to the more detailed diagram of FIGURE 4, this figure actually being composed of FIGURES 4*a*, 4*b*, 4*c* and 4*d* when placed one above the other and with FIGURE 4*a* being at the bottom of the sheets when so arrayed. It should be stressed that FIGURE 4 details the construction of one load control transmitter; it may be assumed to be the one denoted by the letter A of FIGURE 1.

In presenting FIGURE 2, the input control 66 was referred to only generally. At this time, making reference now to FIGURE 4 and more particularly to FIGURE 4*a* thereof, it will be observed that the input control includes a receiver 118 for processing the digital information sent over the communication line 32. As previously indicated, it is not essential for an understanding of the invention to disclose the individual components constituting the receiver, although the components will be described in conjunction with the subsequent discussion of FIGURE 5. All that needs to be appreciated at this time is that the receiver 118 is capable of accepting the serial information as it arrives from the data link or communication line 32, this being in a bit by bit manner. The primary function of the receiver 118 is to demodulate each carrier burst that has been forwarded from the terminal equipment 30 and in effect rectifies and filters these various bursts. Stated somewhat differently, the alternating current portion of the various pulses displayed on FIGURE 3 is removed by the receiver. Thus, the output from the receiver is in the form of discrete direct current pulses of appropriate magnitude. Largely for isolation purposes between the receiver and the output circuitry connected thereto, a current amplifier in the form of an emitter follower denoted generally by the reference numeral 120 has been set forth in this figure, this amplifier being diagrammed in FIGURE 6. While FIGURE 6 depicts an emitter follower which will be described more specifically hereinafter, another amplifier that could be used is an amplifier corresponding generally to the circuit illustrated in FIGURE 7 but with slight modification as will become clearer when discussing FIGURE 7 in greater detail. The same temporal sequence is preserved in the output from the receiver and is of course retained in the output from the amplifier 120. Having mentioned the amplifier 120, perhaps it should be explained that a fairly large number of amplifiers would in practice be utilized in the circuitry of FIGURE 4. Owing to the number of amplifiers plus the fact that persons familiar with the logic art would be able to insert them wherever input-output isolation is desired, these various amplifiers have been omitted for the sake of drafting simplicity.

Before proceeding with the detailed discussion of FIGURE 4, it might be well to state that all of the flip-flop circuits of this figure are reset to their 0 state preparatory to the receipt of information from the terminal equipment 30 over the communication line 32. It is the responsibility of the #1 and #2 auto clear circuits 84, 86 to accomplish this task. For one thing, it will be discerned that there is an automatic clear bus labeled 121 that is controlled by the #1 auto clear circuit 84, this bus assuring that all of the flip-flop stages of the input register are reset to their 0 state. These various stages, incidentally, have been denoted as $IR_1$, $IR_2$, $IR_3$, $IR_4$, $IR_5$, $IR_6$, $IR_7$, $IR_8$, $IR_9$, $IR_{10}$, $IR_{11}$, and $IR_{12}$. Soon to become apparent is the fact that the stages $IR_1$–$IR_6$ are assigned the duty of storing the command portion of the instruction word, whereas the stages $IR_7$–$IR_{11}$ are responsible for storing the address portion of the instruction word, and the stage $IR_{12}$ is assigned the task of accommodating the master bit.

From FIGURE 3, it will be remembered that the first pulse to arrive from the terminal equipment is a sync pulse 82, although such a pulse has to be so interpreted by the input control 66. This pulse arrives via the communication line and is processed by the receiver 118 so as to produce an appropriate direct current pulse that is amplified by the amplifier 120. The amplified pulse is fed to the input of what will be termed a sync gate 122. Provision is made for maintaining this gate 122 in an open or enabled condition so that the sync pulse will be forwarded onto a left shift bus 123. However, the sync pulse 82 can be propagated up to the left shift bus 123 only when the enabling or arming terminal of the gate 122 is energized or actuated. It will be seen that the enabling terminal of the gate is connected to the output side of an AND circuit 124 having four inputs labeled 126, 128, 130, 132. Having mentioned the four inputs to the AND circuit, it will now be pointed out that the input labeled 126 is connected to a sync blanking generator 134 which is normally in a negative state but which is flipped to a positive state when the sync pulse is impressed upon the left shift bus 123. In this regard, it will be observed that a line 156 extends downwardly from the left shift bus 123 to the input side of the sync blanking generator. The sync blanking generator 134 is a one-shot multivibrator and removes the input signal from the input 126 of the AND circuit 124 for a prescribed length of time after the arrival of a sync pulse at the input of said synch blanking generator 134. The sync blanking generator 134, though, will be automatically flipped back after the predetermined interval so that it applies a negative signal, actually −5 volts, to the input 126 of the AND circuit 124. The input denoted by the reference numeral 128 of the AND circuit 124 is connected to the 0 side of the flip-flop stage labeled $IR_{12}$ of the input register 88. The input 130, on the other hand, is connected to the 0 side of a double pulse flip-flop circuit 138. The remaining input 132 is connected to the 0 side of a no pulse flip-flop circuit 140. The function of the double pulse flip-flop and the no pulse flip-flop circuits 138, 140 will soon become clear.

Another path taken by the sync pulse 82 that is impressed on the left shift bus 123 is through an OR circuit 142 having inputs 144, 146 and 148, the input 144 being connected directly to the left shift bus 123 and the others to be referred to later as to their specific connections. The output side of the OR circuit is connected to the input terminal *s* at the 1 side of the #1 auto clear circuit 84. Hence, receipt of a sync pulse 82 (and continued receipt of such pulses) are responsible for maintaining the #1 auto clear circuit 84 in its 1 state, thereby holding the #1 auto clear circuit in a condition such that it cannot perform a clearing function that would otherwise be achieved by clock pulses yet to be described.

A bank of left shift gates has been designated in its entirety by the reference numeral 150. It will be noted that this bank of gates comprises a plurality of gates 152 having their enabling or arming terminals connected to the 1 side of the various input register stages, whereas gates 154 have their arming or enabling terminals connected to the 0 side of the various flip-flop stages constituting the input register 88. The thing to be understood at the moment is that the sync pulse upon arrival at the left shift bus 123, which is in turn connected to the various inputs of the gates 152 and 154 causes the contents of the input register 88 to be left shifted by one bit. Inasmuch as the binary information stored at this time in the input register is constituted of all 0's, there is only a shift of 0's at this particular moment due to the left shift operation.

Owing to the fact that the first sync pulse 82 is instrumental in removing the signal from the input 126 of the AND circuit 124, the AND circuit 124 is disabled so that there is no output available for enabling or arming the sync gate 122. Consequently, as earlier indicated, no further sync pulses can propagate through the sync gate 122 until the appropriate negative signal is restored to the input of the AND circuit 124.

A line 156 extends downwardly from the left shift bus 123 to the sync blanking generator 134 and to the inputs of which have been designated as a receiver 0 gate 158 and a receiver 1 gate 160. These gates are simply two separate pulse delay circuits that are more fully pictured in FIGURE 13. Their function is to provide a square wave pulse after a predetermined length of time determined by the timed sequence graphically presented in FIGURE 3. Thus, the receiver 0 gate 158 puts out a square wave pulse during the time that the input control 66 is scheduled to handle a 0 pulse received at the receiver 118 and the receiver 1 gate 160 is similarly designed so as to put out a square wave pulse during the period that a 1 can be expected if it happens to be included as an integral portion of the instruction word. More will be said presently concerning the role played by the receiver gates 158, 160.

At this time, attention is called to the fact that the same sync pulse 82 is also delivered to the input terminal at the 1 or set side of the no pulse flip-flop circuit 140, thereby flipping this no pulse flip-flop circuit to its 1 state. When the no pulse flip-flop circuit 140 is flipped to its 1 state, it will be understood that the input 132 of the AND circuit 124 is inactivated, thereby serving as a secondary lock-out for the AND circuit 124 whose usual function is to provide an enabling signal for the sync gate 122. Consequently, double assurance is made that the sync gate 122 is closed, for the input 126 from the sync blanking generator is already removed and as just described the input 132 from the no pulse flip-flop circuit 140 is likewise removed. It will be appreciated that all four inputs 126–132 must be energized before an output is obtained from the AND circuit 124, this being typical of AND circuits in general.

Due to what has transpired up to this moment, it will be concluded that the input control 66 has at this time been conditioned for the receipt of either a 1 or a 0 pulse. Because our instruction word has been selected to be 100101011001, the first 1 representing the master bit, the pulse 68 that is to be received just after the first sync pulse 82, is bound to be a 1, assuming that the system is functioning properly. Reliable checking arrangements are incorporated into the system to make sure that this is the case. At any rate, when the master bit comes into the receiver 118, it is steered to the input of a gate 162 that is enabled or armed by an AND circuit 164 having one input 166 thereof connected to the output from the receiver 1 gate 160. The other input 168 of this AND circuit 164 is connected to the 0 side of a 1's lock-out flip-flop circuit 170. Since the 1's lock-out flip-flop circuit 170 has been initially reset to its 0 state, it will be appreciated that both inputs of the AND circuit are actuated concurrently so as to apply an enabling signal to the gate 162. The gate 162 is thereby opened and the master bit pulse, which is a 1, is transmitted to the 1 input terminal *s* of the input stage labeled $IR_1$. This action of course flips the stage $IR_1$ into its 1 state.

Another path traversed by the master bit pulse 68 is downwardly through one input 172 of an OR circuit 174 having its output connected to the 0 input terminal *r* of the no puse flip-flop circuit 140. Receipt of this particular pulse at the no pulse flip-flop circuit 140 switches the no puse flip-flop to its 0 state and this in turn connects the 0 side of the no pulse flip-flop to the input 132 of the AND circuit 124. By this time the sync blanking generator 134 has re-established the energization of the input 126 that it controls. Consequently, all four inputs 126–132 are actuated and the AND circuit 124 provides an enabling signal for the sync gate 122, thereby readying the sync gate 122 for the passage of the second sync pulse 82.

Should for some reason the pulse 68 representing the master bit be lost, then obviously the no pulse flip-flop circuit 140 would not be switched back to its reset or 0 state and the input to the AND circuit 124 would not be re-established, even though the input connected to the sync blanking generator 134 is made. In other words, the no pulse flip-flop circuit 140, as its name signifies, checks to see whether there has actually been a pulse that followed the first sync pulse 82 and this no pulse flip-flop circuit 140 checks in each period after a sync pulse as to whether a pulse is received.

Supposing now, for the sake of a comprehensive discussion, that a spurious pulse followed the master bit pulse 68 prior to the arrival of the second sync pulse 82. It will be understood that there is a time interval of sufficient duration after the forwarding of the first sync pulse 82 so as to accommodate either a 1 or a 0 pulse. It so happens that we are at this moment concerned with this handling of a master bit pulse and therefore we know that the proper pulse during the time interval now under discussion should be only a 1. However, if a spurious pulse does come through within the time interval set aside for the receipt of a 0 pulse, the system without a proper safeguard would interpret this erroneous pulse as a legitimate 0 pulse. This is prevented, though, for such a pulse would be transmitted to the input of a gate 176 having its enabling terminal connected to the output of an AND circuit 178 which has two inputs, one input 180 being connected to the receiver 0 gate 158 and the other input 182 to the 0 side of a 0's lock-out flip-flop circuit 184. Inasmuch as the 0's lock-out flip-flop circuit 184 is in its 0 state, the transmission of a square wave pulse from the receiver 0 gate 158 will cause an output signal to be applied to the enabling or arming terminal of the gate 176. The propagated signal through the gate 176 will be applied to a second input 186 on the OR circuit 174 that has previously been referred to and the OR circuit 174 will cause an output to be applied to the input of a test gate 188 having its enabling terminal connected to the 0 side of the no pulse flip-flop circuit 140. With the no pulse flip-flop circuit 140 in its 0 state, it follows that the spurious pulse will be propagated through the test gate 188 and will be applied to the input terminal *s* at the 1 side of the double pulse flip-flop circuit 138. As a consequence of this, the 0 side of the double pulse flip-flop 138 circuit is no longer provided with a signal that is applied to the input 130 of the AND circuit 124. The 1 side of the double pulse flip-flop circuit 138, however, is connected to the enabling terminal of a gate 190 which has its input connected to the automatic clear bus 121 on FIGURE 4*b*, this particular gate causing clearing of the double pulse flip-flop circuit 138 when a clock pulse is applied to the automatic clear bus 121. This will not occur until the transmitter A is reset to 0 due to the fact the sync pulses 82 can no longer be delivered to the #1 auto clear circuit 84 and the #1 auto clear circuit will therefore cause a clearing action to take place.

Although a processing of a 0 pulse has not as yet been discussed in detail, it will be well to take cognizance of the role performed by the 1's and 0's lock-out circuits 170 and 184. The sole purpose of these two circuits is to make certain that two 1's or two 0's are not received during the same time period. Thus, while the double pulse flip-flop circuit 138 takes care of the possibility of a 1 and 0 pulse being received in the same period, it is the responsibility of the 0's and 1's lock-out circuits to make certain that two 1's or two 0's are not processed if received. This is accomplished by the fact that when a 1 pulse is forwarded from the receiver, it not only is forwarded to the input register stage $IR_1$ but after being propagated through the gate 162 it flips the 1's lock-out flip-flop circuit 170 to its 1 state, thereby removing the input 168 on the AND circuit 164. Therefore, until another sync pulse 82 is applied to the input terminal *r* of the 1's lock-out flip-flop circuit 170 so as to flip it back to the 0 state, no further pulses can be forwarded from the receiver 1 gate 160 and the second pulse, which would have to be a spurious one, could not get through to the first stage $IR_1$ of the input register 88.

By the same token, the 0's lock-out flip-flop circuit 184 is assigned the task of preventing two 0 pulses from coming through. The operation is identical in a sense with what transpires in connection with the 1's lock-out flip-flop circuit operation. In this regard, the 0 side of the 0's lock-out flip-flop circuit 184 is connected to the input 182 of the AND circuit 178. Due to this mode of connection, when a 0 pulse is received, it flips or switches the 0's lock-out flip-flop circuit 184 to its 1 state, thereby removing this input 182 from the AND circuit 178 so that it is then impossible for the enabling terminal of the gate 176 to be armed so as to propagate any additional 0 pulses that might be forwarded from the receiver 118.

If the information from the terminal equipment 30 is being received properly at the receiver 118, then up to this point we would have a 1 registered in the first input stage $IR_1$ of the input register 88. Under these circumstances the second sync pulse 82 is ready to be received, and the AND circuit 124 will have all of its inputs 126–132 energized so as to arm the enabling terminal of the sync gate 122. The second sync pulse 82 is processed in the same fashion as was the first one and is forwarded to the left shift bus 123 and performs a left shift operation. The left shift operation involves the setting of the second stage labeled $IR_2$ of the input register 88 to its 1 state, it having been up to this time in its 0 state. The first stage $IR_1$ remains in its 1 state, though. In addition to achieving a left shift operation, the second sync pulse, as did the first one, triggers the sync blanking generator 134 into operation so as to remove the input signal at the input 126 of the AND circuit 124, and simultaneously transmits a pulse to the input 144 of the OR circuit 142 so as to maintain the #1 auto clear circuit 84 (FIGURE 4*c*) in its 1 state.

With the input control 66 conditioned or readied for the reception of another 1 or 0 pulse, the pulse 69 that actually comes through is a 0 because of the instruction word that we have selected, this instruction word being 100101011001 with the first bit of the address portion being a 0 as already explained. The pulse 69 following the second sync pulse 82, which is a 0 pulse, cannot get through the sync gate 122, because this gate is now closed due to the removal of the inputs 126 and 132 from the AND circuit 124 which action precludes a signal from being applied to the enabling terminal of the sync gate 122. While the receiver 1 gate 160 functions during the second period just as it did during the first, nonetheless its output pulse has already been generated and caused the enabling terminal of the gate 162 to be armed at that time, but since there was no 1 pulse forwarded from the receiver 118 then, there was no passage of a pulse to the 1 input terminal *s* of the first stage labeled $IR_1$.

However, the picture is quite different with respect to the receiver 0 gate 158, for it is now functioning to produce an output pulse at the appropriate time which is impressed on the enabling terminal of the gate 176 through the AND circuit 178. Because of the armed condition of the gate 176, the pulse 69 representing 0 passes up to the 0 input terminal *r* of the first stage $IR_1$ of the input register 88 thereby resetting this particular stage to its 0 state.

After passage through the gate 176, the pulse 69 representing 0 is also applied to the input 172 of the OR circuit 174 so as to reset the no flip-flop circuit 140 back to its 0 condition.

As with the master bit pulse 68, the pulse 69 now being discussed will actuate the input 146 of the OR circuit 142 so as to keep the #1 auto clear circuit 84 in its 1 state. This prevents a clearing operation from occurring.

In describing FIGURE 2 mention was made of the existence of clock pulses; these clock pulses have also been referred already in conjunction with FIGURE 4. The power source from which these clock pulses are derived is indicated by the reference numeral 192 and a transformer 194 has its primary winding 196 connected directly to this source whereas its secondary winding 198 is connected to a double pole, double throw phase reversing switch 200. The clock pulses themselves are generated by a triggering action within what is called a line clock 202. One clock pulse is formed for each cycle and inasmuch as the source 192 is a 60-cycle frequency source there will be 60 clock pulses generated each second. These clock pulses are not in correspondence with the previously alluded to sync pulses, even though they are both produced on a time basis. The output from the line clock 202 is differentiated by differentiator 204 to provide the actual clock pulses; these pulses having a width on the order of five microseconds and these clock pulses are then impressed on a clock pulse bus 206 that services various components on all four sheets constituting FIGURE 4. Having mentioned the #1 auto clear flip-flop circuit as an example, it can be discerned that the 1 side of the #1 auto clear flip-flop circuit is connected to the enabling terminal of a gate 208 which has its main input connected directly to the clock pulse bus 206. This has the effect of switching the #1 auto clear circuit 84 back to its 0 state if the #1 auto clear flip-flop circuit 84 fails to receive signals via the OR gate 142. It will be recalled that the OR gate has three inputs 144, 146 and 148, the input 144 being connected to the left shift bus 123 so that it receives the sync pulses 82, the input 146 being connected so as to receive the 1 pulses, and the input 148 being connected so as to receive 0 pulses. The result of this particular OR circuit connection is that these various pulses must continue to arrive at the input terminal *s* at the 1 side of the #1 auto clear flip-flop circuit 84 in order to keep it from flipping to its 0 or reset state, which state would perform various clearing operations throughout the circuitry of FIGURES 4*a* and 4*b*.

Continuing now with the processing of the instruction word 100101011001, it will be appreciated that two time periods have now elapsed as far as FIGURE 3 is concerned. By this, it is meant that two sync pulses have been received, together with one 1 and one 0 pulse. The manner in which the information up to this point has been handled should be readily apparent from the description that has been presented. When the third sync pulse 82 arrives, it will condition the input control 66 in the same manner that the two initial sync pulses did. In accomplishing their objective, the sync pulses 82 each performed a left shift operation as far as the input register 88 is concerned. The third sync pulse will do the same and so will the remaining sync pulses that are associated with the particular word that has been selected for illustrating the functioning of the transmitter. Therefore, a total of twelve sync pulses (see FIGURE 3) will be received at the receiver and each of these sync pulses will be processed so as to perform a left shift operation, this being bit by bit.

After receipt of each sync pulse 82, a test will be made for a double pulse and of course for a no pulse condition. In addition to this, it will be impossible for two pulses representing a 1 or two pulses representing a 0 to pass into the input register 88 during the same time interval, appropriate prevention of this being made as already described.

It perhaps should be mentioned at this point that no provision is made for a permanent storage of any of the faults that are likely to occur. This could be done but it would only serve to unduly complicate the description and drawings. Thus, the equipment that has been illustrated only detects a fault condition and prevents acceptance of the message should such a fault condition arise, clearing the input register 88 to 0 and also clearing the various flip-flop circuits to 0. The clearing terminal of the various flip-flop circuits depicted in FIGURE 4 are readily recognizable, such a terminal being at the left of the individual blocks and indicated by the letter *c*. Also, although not shown on FIGURE 4, each flip-flop is provided with a manual set. However both the manner in which the various flip-flop circuits can be cleared and also set will be easily comprehended from an inspection of FIGURE 14, especially in conjunction with the more specific description of this particular figure that will hereinafter be given.

Having described in considerable detail the processing of two sync pulses, it will now be readily understood that the receipt of all twelve sync pulses in the serial fashion that is contemplated will result in the stage $IR_{12}$ of the input register 88 being switched from its 0 state to its 1 state. This is by the simple expedient of continually shifting the master bit to the left and when it reaches the last stage $IR_{12}$ it causes the flip-flop circuit constituting this particular stage to go to its 1 condition or state. It was previously explained that the AND circuit 124 is equipped with four inputs 126–132 and at this time attention is called to the fact that the input 128 is connected to the 0 side of the stage $IR_{12}$. Thus, when the stage $IR_{12}$ is switched to its 1 state there is no longer a signal impressed upon the input 218 of the AND circuit 124 and there is therefore no signal impressed on the enabling terminal of the sync gate 122. Hence, further sync pulses 82 cannot get through to the left shift bus 123, the left shift gates 150, and elsewhere within the input control 66. In addition, it continues to lock out the #1 auto clear circuit 84 because sync pulses must be impressed on the input terminal at the 1 side of this auto clear circuit to prevent a clearing operation from occurring. In other words, the #1 auto clear circuit 84 is rendered ineffectual and the information contained in the input register 88 will be retained there until further action takes place.

The run control flip-flop circuit 93 was referred to generally in connection with the description of FIGURE 2; at this time, however, more specific reference will be made to this particular circuit. The run flip-flop circuit 93 must be in its 0 state before the contents of the input register 88 can be translated out. The manner in which the run flip-flop circuit 93 is returned to its 0 state is better reserved for later discussion, however. Assuming at the moment that the run flip-flop circuit 93 has been returned to 0, its 0 side completes a circuit to an input 208 associated with the AND circuit 90, the output of which is connected to an enabling terminal on a gate 210 having its main input tied to the clock pulse bus 206. One of the other two inputs, this input being denoted by the numeral 212, is connected to the 0 side of the last stage $IR_{12}$ of the input register 88 and the third input 214 belonging to this particular AND circuit 90 is connected to the 0 side of the #1 auto clear flip-flop circuit 84. At the moment all three inputs of the AND circuit 90 are activated and therefore an output signal is applied to the enabling terminal of the gate 210. Consequently, the next clock pulse impressed on the clock pulse bus 206 will pass or be propagated through this gate 210 and the propagated pulse will be applied to the input terminal *r* at the 0 side of the stage $IR_{12}$. This action, of course, resets the flip-flop constituting the stage $IR_{12}$ to its 0 state.

It will be noted that the line servicing the 0 input terminal *r* of the stage $IR_{12}$ is also connected to the input of a gate 216. The gate 216 is armed or enabled by reason of an AND circuit 218 having five inputs associated therewith. Each of the inputs is connected to one of the five manually operated address select switches collectively identified as 92 and including individual switches 219, 220, 221, 222, 223. These individual switches can be set to what corresponds to a 0 or 1 position and inasmuch as the address assigned to the particular transmitter now being described has the code 00101, it will be understood that the switches 219, 221 are set to their 1 position and the other three switches 220, 222 and 223 are set to their 0 position. These switches have their 0 and 1 position contacts connected directly to the stages $IR_7$, $IR_8$, $IR_9$, $IR_{10}$, and $IR_{11}$ of the input register 88 because these five stages constitute the address portion of the register. In its filled condition, stage $IR_7$ will be in its 1 state, $IR_8$ in its 0 state, $IR_9$ in its 1 state, $IR_{10}$ in its 0 state, and $IR_{11}$ in its 0 state. Consequently, all five inputs to the AND circuit 218 will be energized at the same time and a signal will therefore be applied to the enabling terminal of the gate 216. The gate 216 is therefore open so as to pass the next pulse delivered to its input to a command transfer bus 224 serving a bank 94 of command transfer gates grouped and labeled 226 and 228, respectively. The enabling or arming terminals of these gates are connected as can be seen in FIGURE 4*b* to the 0 and 1 sides of the input register stages $IR_1$, $IR_2$, $IR_3$, $IR_4$, $IR_5$ and $IR_6$. Thus, when the command transfer bus 224 is energized, the pulse performing this energization is propagated through the appropriate gates that are open, the gates that are open being determined by the condition of the stages $IR_1$–$IR_6$.

Due to the translation effected by the energization of the command transfer bus 224, the content of the register stages $IR_1$–$IR_6$ is transferred to the six-bit command register 96 composed of stages $CR_1$, $CR_2$, $CR_3$, $CR_4$, $CR_5$ and $CR_6$. Inasmuch as the command portion of the instruction word has the code 011001, this being the information stored in the stages $IR_1$–$IR_6$, the stage $CR_1$ will be triggered into its 1 state and so will the stages $CR_4$ and $CR_5$, whereas the remaining stages $CR_2$, $CR_3$ and $CR_6$ will remain in their 0 state.

The same pulse coming out of the gate 216 that effects the transfer of command information from the input register 88 to the 6-bit command register 96 also sets the start flip-flop circuit 102 to 1, for the gate 216 has its output terminal connected to the input terminal *s* of the start flip-flop circuit 102.

It is of importance to realize that all five inputs of the AND circuit 218 must be energized in order to produce the translation of the command portion of the instruction word into the 6-bit command register 96. This translation can only be accomplished, therefore, when the address stored in the stages $IR_7$–$IR_{11}$ is correct or properly considered to be the particular address that is intended for the transmitter A that is currently being described. For the moment, it need only be appreciated that the #2 auto clear flip-flop circuit 86 that was briefly described in connection with FIGURE 2 performs a clearing operation along with the clearing action derived from the #1 auto clear circuit 84. The manner in which the #2 auto clear flip-flop circuit 86 accomplishes this assigned task will become clearer as the description progresses.

Continuing the description on the basis that the address is correct and that the command portion of the instruction word is now staticized or stored in the 6-bit command register 96, it is understood that the stored command contain several 1's. It is necessary that the command contain at least one 1; otherwise six inputs denoted by the reference numerals 231, 232, 233, 234, 235, 236 belonging to an AND circuit 238 (part of the no command translator 98) will be simultaneously energized together with an additional input 240 that is energized from the 0 side of the last stage $IR_{12}$ of the input register 88. The removal of any of the seven inputs of this AND circuit 238 will prevent an output from being applied to the enabling terminal of an AND gate 242 (also part of the no command translator 98) with the consequence that the next clock pulse from the clock pulse bus 206 will be propagated through this gate 242 and will reset the #2 auto clear flip-flop circuit 86 to its 0 state. Connected to the 0 side of the #2 auto clear flip-flop circuit 86 is one input 244 of an AND circuit 246, the other input 248 to this particular AND circuit being connected to the 0 side of the input register stage $IR_{12}$. The output from the AND circuit 246 is in turn attached to the enabling terminal of a gate 250 having its input connected to the clock pulse bus 206. Consequently, when the gate 250 is open the next clock pulse will pass through the now open gate and a circuit can be traced to the clear terminal *c* of the flip-flops on FIGURES 4*c* and 4*d*, thereby causing an automatic resetting of these flip-flops to their 0 state.

From the foregoing information, it will be seen that the start flip-flop circuit 102 is currently in its 1 state and this causes an application of a signal to one input 252 of the AND circuit 100, the other input 254 of this AND circuit being connected directly to the 0 side of the run control flip-flop circuit 93. With both inputs 252, 254 energized, then an output is forwarded to the enabling terminal of a gate 256 located at the lower right-hand corner of FIGURE 4*c*. The input of this particular gate 256 has a circuit connection with the clock pulse bus 206 and therefore when the gate is open clock pulses are permitted to pass through.

Now to be described is the three bit command counter 104 which contains flip-flop stages $CK_1$, $CK_2$ and $CK_3$. Both the *r* and *s* input terminals of the stage $CK_1$ are connected to the gate 256, and it is to be noted that two additional gates 258, 260 are likewise connected to the gate 256. The gate 258 has its enabling terminal connected to the 1 side of the counter stage $CK_1$, whereas one input 262 of an AND circuit 264 also finds electrical connection to the 1 side of the counter stage $CK_1$. The AND circuit 264 has a second input 266 which is connected to the 1 side of the second stage $CK_2$ of the three bit command counter 104.

Coacting with the three bit command counter 104 is the command translator 106 comprised of six AND circuits 268, 269, 270, 271, 272, 273, each having a gate 274 associated therewith. These AND circuits 268–273 are provided with five individual inputs and it is to be discerned that one input 276 is connected to the 1 side of each of the stages $CR_1$–$CR_6$ constituting the 6-bit command register 96. The inputs 278 of the AND gates 268, 270 and 272 are joined together and are in turn connected to the 1 side of the first stage $CK_1$ and in turn to the arming terminal of the gate 258. Similarly the inputs 278 of the AND circuits 269, 271 and 273 are joined together and are connected to the 0 side of this first stage $CK_1$. On the other hand, the inputs 280 of the AND circuits 269, 270 and 273 are joined together and connected to the 1 side of the stage $CK_2$ as well as to the input 266 of the AND circuit 264, whereas the inputs 280 of the AND circuits 268, 271 and 272 are tied to the 0 side of stage $CK_2$. The inputs 282 of the AND circuits 271, 272 and 273 are joined together and are connected to the 1 side of the stage $CK_3$, whereas the inputs 282 of the AND circuits 268, 269 and 270 are attached in unison to the 0 side of stage $CK_3$. The remaining inputs 284 of these six AND circuits are joined together and connected to the 0 side of the run control flip-flop circuit.

Inasmuch as we have a 1 setting in the first stage $CR_1$ of the six-bit command register 96, the input 276 of the AND circuit 268 will have a signal applied thereto. Actually, all of the inputs of this AND circuit will have signals impressed thereon with exception of the input 278 which is electrically connected to the 1 side of the first stage $CK_1$ of the three bit command counter 104, this particular input depending upon the arrival of a clock pulse from the clock pulse bus 206. Because our code portion of the instruction word is 011001, when the command counter 104 starts to count, it will cause a completion of the AND circuit 268 and a corresponding output is produced which is applied to the enabling terminal of the gate 274 which is associated with the AND circuit 268, this gate depending upon an arrival of a pulse from the gate 256 which pulse passes through the now open gate 274 that is armed by the AND circuit 268 to one input 286 of an OR circuit labeled 288. The OR circuit 288 has a total of six inputs, the remaining inputs being denoted by the reference numerals 290, 292, 294, 296 and 298. The output of the OR circuit 288 is connected to the input terminal *s* at the 1 side of the run control flip-flop circuit 93 and upon the three bit command counter 104 reaching a count of only 1 will cause the run control flip-flop circuit 93 to be switched to its 1 state with a corresponding energization of the enabling terminal associated with a gate 300 having its input connected to the clock pulse bus 206.

Consequently, reiterating somewhat, upon the advancement of the command counter 104 to its 1 state it caused the run control flip-flop circuit 93 to go to 0, as pointed out above, and this disabled the AND circuit 100 because its input 254 is connected to the 0 side of the run control flip-flop circuit, its other input 252 being connected to the 1 side of the start control flip-flop 102. This action opens the gate 256, for the output from the AND circuit 100 is connected directly to its enabling terminal, and in this way further clock pulses are prevented from triggering the command counter 104. The command counter 104 will, therefore, lock up at 1 in this particular situation.

The three bit command counter 104 will not begin counting again until certain other conditions are met. These conditions are now to be described and it is to be pointed out that when the run control flip-flop circuit 93 was switched to its 1 state it completed an arming or enabling path to the enabling terminal on the gate 300 having its input connected to the clock pulse bus 206. What occurs then is that the gate 300 is opened and the next clock pulse is permitted to propagate therethrough to the three bit pulse counter 108 at the left in FIGURE 4*d*.

The three bit pulse counter 108 is comprised of three flip-flop stages $PK_0$, $PK_1$ and $PK_2$ and will run until its three stages reach an octal seven count (111) which will complete an AND circuit at 302 having three inputs 304, 306 and 308, each of which is connected to the 1 side of the stages $PK_0$, $PK_1$ and $PK_2$; the AND circuit 302 is to be considered part of the stop translator 112. The three bit counter 108, in order to accomplish the foregoing counting operation, additionally includes a gate 310 having its enabling terminal connected to the 1 side of the stage $PK_0$ and its input to the gate 300. The gate 310 therefore permits propagation of a pulse, when open, to the input terminal *s* at the 1 side of the stage $PK_1$. Also present in the three bit counter 108 is an AND circuit 312 having a first input 314 connected to the 1 side of the stage $PK_0$ and a second input 316 connected to the 1 side of the stage $PK_1$. The output of the AND circuit 312 is attached to the enabling terminal of a gate 318 having its input connected to the gate 300 and its output to the input terminal *s* at the 1 side of the stage $PK_2$. Thus, as already indicated, the three bit pulse counter 108 is capable of counting to octal seven (111). In other words seven clock pulses from the clock pulse bus 206 are counted by the three-bit pulse counter 108.

Each time that a clock pulse is counted as it is propagated through the gate 300, this same pulse goes to a gate 320 having its enabling terminal connected to the 0 side of the transmit control flip-flop circuit 110. The gate 320 is thus in an open condition so that a clock pulse is applied to the input terminal *s* at the 1 side of the transmit control flip-flop circuit 110. When the transmit control flip-flop circuit 110 is set to 1, it applies a signal to the enabling terminal of a gate 322 having its input connected directly to the clock pulse bus 206. In this way clock pulses, more specifically seven of them, are permitted through the gate 322 to the modulator pulse generator 114. This pulse generator 114 is similar in design to the sync blanking generator 134, both being one-shot multivibrators. Each time that a clock pulse is applied to the input of the modulator pulse generator 114 a negative pulse having a width on the order of five milliseconds is generated and applied to the three phase exciter 36.

Before describing the actual transmission of power bursts derived from the seven pulses that have just been generated by the modulator pulse generator 114, it is best to consider the presence of a bank 324 of memory flip-flop circuits comprised of six individual flip-flops labeled 326, 328, 330, 332, 334, and 336. When the gate 274 associated with the AND circuit 268 of the command translator 106 actuates the input 286 to the OR circuit 288, it also actuates or applies a pulse to the input terminal *s* at the 1 side of the memory flip-flop circuit 326, thereby setting the flip-flop 326 to its 1 state. Memory flip-flop 326 is associated with channel #1, and it will be recalled from the instruction word that this is one of the channels over which we desire to transmit. The memory flip-flop circuit 326 will remain in its 1 condition until a gate 338 is opened by reason of all three inputs 304, 306, 308 on the AND circuit 302 being simultaneously energized, which state of affairs indicates that an octal seven count has been reached by the three bit pulse counter 108. The AND circuit 302 and the gate 338 constitute the stop translator 112.

Connected to the 1 side of each of the memory flip-flops 326–336 is an amplifier or relay puller 340, more fully treated hereinafter. Connected to the various outputs of the relay pullers 340 are relays 342, 344, 346, 348, 350, 352, each provided with three sets of contacts 354, 356, 358 that are normally open but which are closed when the relay associated therewith is energized via its relay puller 340.

Six different carrier frequencies are generated by what have been termed the oscillators 361, 362, 363, 364, 365, and 366, each oscillator being designed to generate a particular frequency. In practice, an average carrier frequency of about 17 kilocycles has been found satisfactory with the frequency of each channel differing from the next by about 1 to 2 kc. Therefore, the oscillator 361 may be considered to have a frequency of 12 kc., the oscillator 362 14 kc., the oscillator 363 16 kc., the oscillator 364 18 kc., the oscillator 365 20 kc. and the oscillator 366 22 kc., although smaller increments than those listed can also be employed. Thus, when the relay 342 is energized, its contacts 354, 356 and 358 are closed and the 12 kc. signal generated by the oscillator 361 is delivered to the three-phase exciter 36. Naturally, the coils 44*a* and the capacitors 46*a* will be selected so as to provide a resonant condition at 12 kc.; likewise, the remaining coils 44*b–f* and capacitors 46*b–f* will be tuned in each instance to the carrier frequencies of the other channels.

Figure 17:
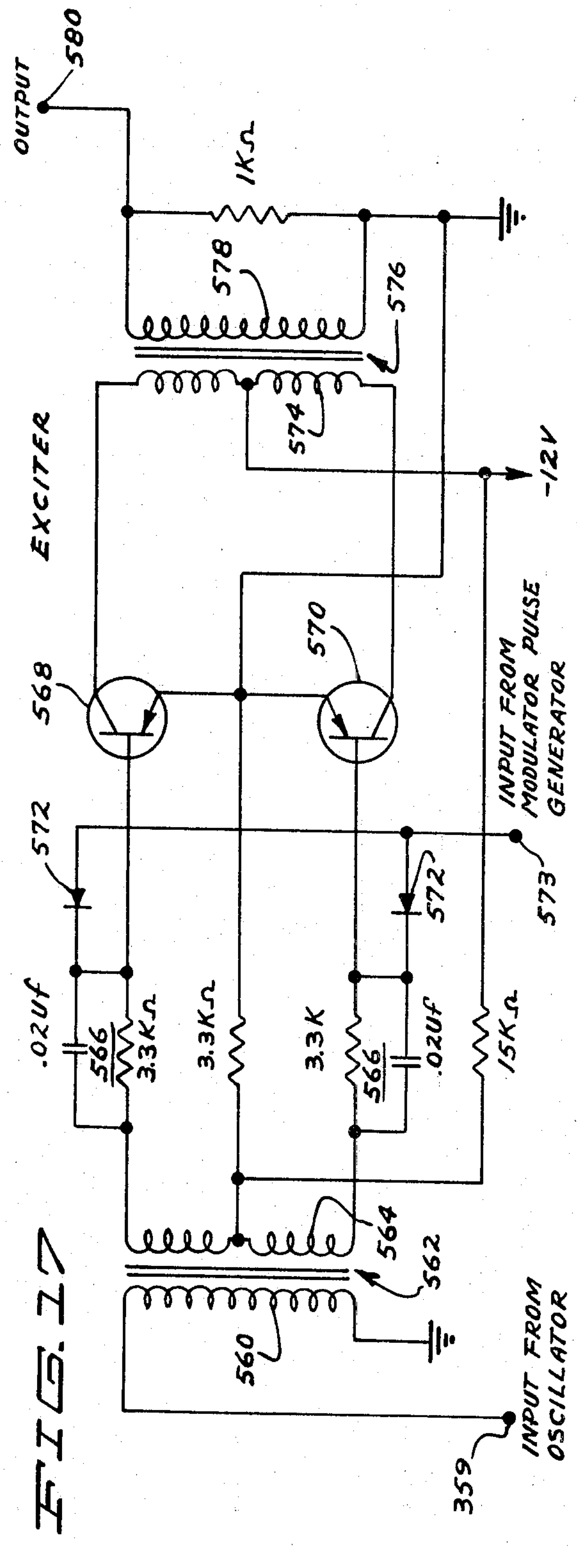
FIGURE 17 is a schematic view of a single-phase exciter, three of these exciters constituting what is termed a three-phase exciter.

At this time, it will be remembered that the modulator pulse generator 114 puts out a group of seven pulses during the period that the three bit pulse counter 108 is counting to octal seven. Since each of the pulses from the pulse generator 114 has been suggestively selected to have a time duration or width of five milliseconds, this leaves almost seventeen seconds between such pulses because the pulse generator 114 is triggered by clock pulses which are supplied at a rate of 60 per second. While the exciter 36 is normally inactive or unenergized, the arrival of a negative pulse from the pulse generator 114 applies a bias to the exciter 36 such as to permit the carrier frequency signal to pass through the exciter in a gate-like manner; when the exciter 36 is not energized by a pulse, no carrier signal is passed. The manner in which the exciter 36 functions is shown in FIGURE 17 which figure will be referred to later. Therefore, when the three-phase carrier frequency signal produced by the oscillator 361 is fed to the three power amplifiers 38 it is amplified and the amplified output from these amplifiers is delivered in the form of a series of power bursts to the various line couplers 42 which are connected directly to the power lines 40 (FIGURE 1). As with other factors herein mentioned, values that are given are only illustrative and can be selected to suit best the particular distribution system. This holds true for the power bursts, but as a guide it can be stated that each of the amplifiers 38 should have an output of about 300 to 400 watts. Inasmuch as these power bursts that are to be transmitted over the lines 40 are each for only a short period of time, five milliseconds having been mentioned, the average power used is virtually insignificant for the number of receivers that are to be actuated thereby. Later, the manner in which the receivers 54 that are responsive to these transmitted signals or power bursts will be described, these receivers being the same as the receivers 56 and 58, except for different response characteristics.

Reverting now to the completion of the AND circuit 302, the resulting opening of the gate 338 causes a pulse to be forwarded to the various input terminals at the 0 side of the bank 324 memory flip-flops 326–336. This same pulse is delivered to the input terminal *r* at the 0 side of the run control flip-flop circuit 93, thereby resetting the run control flip-flop circuit to its 0 state. This has the effect of re-establishing an input signal at the input 254 of the AND circuit 100. Inasmuch as the start control flip-flop circuit 102 is in its 1 state, an output is transmitted from the AND circuit 100 to the enabling terminal of the previously referred to gate 256 that permits clock pulses to operate or run the three-bit command counter 104 at the right of FIGURE 4*c*. In this way, the three-bit command counter 104 is conditioned for operation by the next clock pulse that is impressed on the clock pulse bus 206, this pulse being propagated through the gate 256. Inasmuch as the enabling terminal on the gate 256 is connected to the 1 side of stage $CK_1$ this clock pulse that we are currently processing is permitted to pass through the gate to the input terminal *s* at the 1 side of the stage $CK_2$, thereby setting the stage $CK_2$ to its 1 state. It will be observed that the 1 side of the stage $CK_2$ is connected to the input 280 of the AND circuit 269. However, it is also to be taken into account that the 1 side of the second stage $CR_2$ of the six-bit command register 96 has its 1 side connected to the input 276 of this same AND circuit 269. Owing to the fact that the second stage $CR_2$ is in its 0 state, this being so because the instruction word that we have adopted, more specifically the command portion thereof, does not contain a 1.

Because of the lack of a 1 in stage $CR_2$, the end result is that the gate 274 associated with the AND circuit 269 does not open and therefore no signal is forwarded under these circumstances via the OR circuit 288 due to the fact that no signal is applied to the input 290 thereof. Therefore, the three bit command counter 104 merely keeps on counting when the next clock pulse is propagated through the gate 256. The above procedure is continued until the memory flip-flops 326, 332 and 334 have all been sequentially set to their 1 state, this being due to the counting ability of the three-bit command counter 104.

Concurrently with the above happening is the priduction of a group of seven pulses by the modulator pulse generator 114 which is triggered into operation by seven clock pulses propagated through the gate 322, this gate having its enabling terminal actuated via the 1 side of the transmit control flip-flop circuit 110.

The clearing operation performed by the #1 auto clear flip-flop circuit 84 is fairly evident from what has been herein presented during the early portion of the description pertaining to FIGURE 4. In this regard, it is to be observed that the 0 side of the #1 auto clear flip-flop circuit is connected to one input 367 of an AND circuit 368 in addition to the previously mentioned input 214 of the AND circuit 90. The AND circuit 368 has a second input 369 connected directly to the 0 side of the master bit stage $IR_{12}$ of the input register 88. The output of the AND circuit enables a gate 369 which is connected to the clock pulse bus 206 to propagate, when the gate 369 is open, a clock pulse to the previously mentioned auto clear bus 121. Not only does the auto clear bus 121 service the input register 88, as far as clearing same, but there is an electrical connection from this bus 121 to the clearing terminals *c* on the 1's and 0's lock-out flip-flop circuits 170, 184 on FIGURE 4*a*. Still further, it will be noted that in addition to the gate 190, which is associated with the double pulse flip-flop circuit 138, being connected to the bus 121, there is a gate 370, enabled by the 1 side of the no pulse flip-flop circuit 140, that receives pulses via said bus 121 for clearing of said flip-flop 140.

At this stage, it is now believed that the clearing functions performed by the #2 auto clear flip-flop circuit 86 should be readily apparent also. Briefly, it can be stated that the #1 auto clear flip-flop circuit 84 clears all of the flip-flops located on FIGURES 4*a* and 4*b*, whereas the clearing operation of the #2 auto clear flip-flop circuit 86 should be readily apparent also. Briefly, it can be stated that the #1 auto clear flip-flop circuit 84 clears all of the flip-flops located on FIGURES 4*a* and 4*b*, whereas the clearing operation of the #2 auto clear flip flop circuit 86 is consummated on FIGURES 4*c* and 4*d*. The clearing action of the #2 auto clear flip-flop circuit takes place when it is in its 0 state and does so through the AND circuit 246 which has its input 244 connected to the 0 side of this clearing circuit and its other input 248 connected to the 0 side of the last or master bit stage $IR_{12}$ of the input register 88 (FIGURE 4*b*).

Figure 4A:
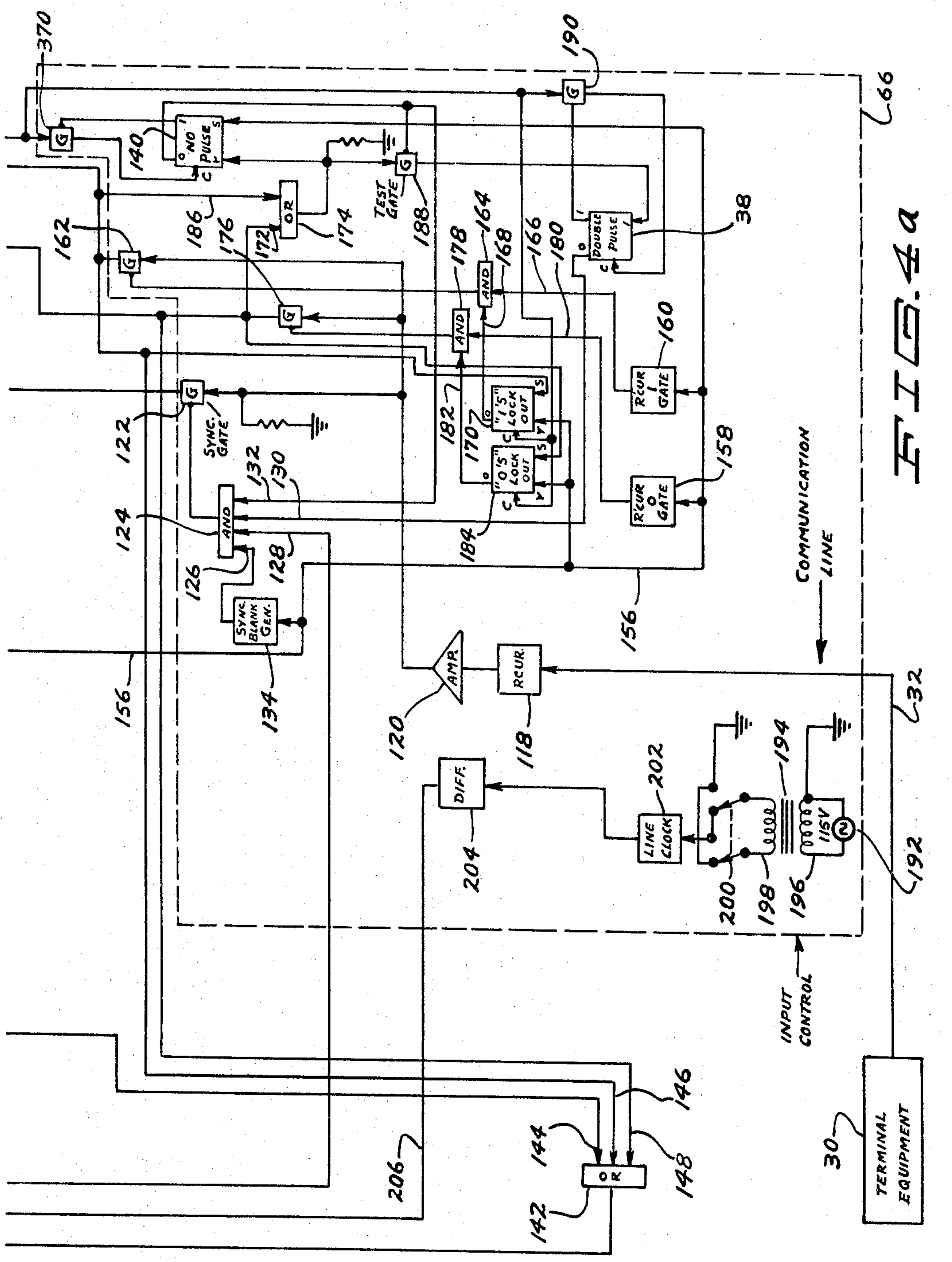
FIGURE 4 is a more detailed diagram, largely in block form, of one of the load control transmitters, this figure actually consisting of FIGURES 4*a*, 4*b*, 4*c*, and 4*d* when placed one above the other with FIGURE 4*a* being lowermost.
Figure 4B:
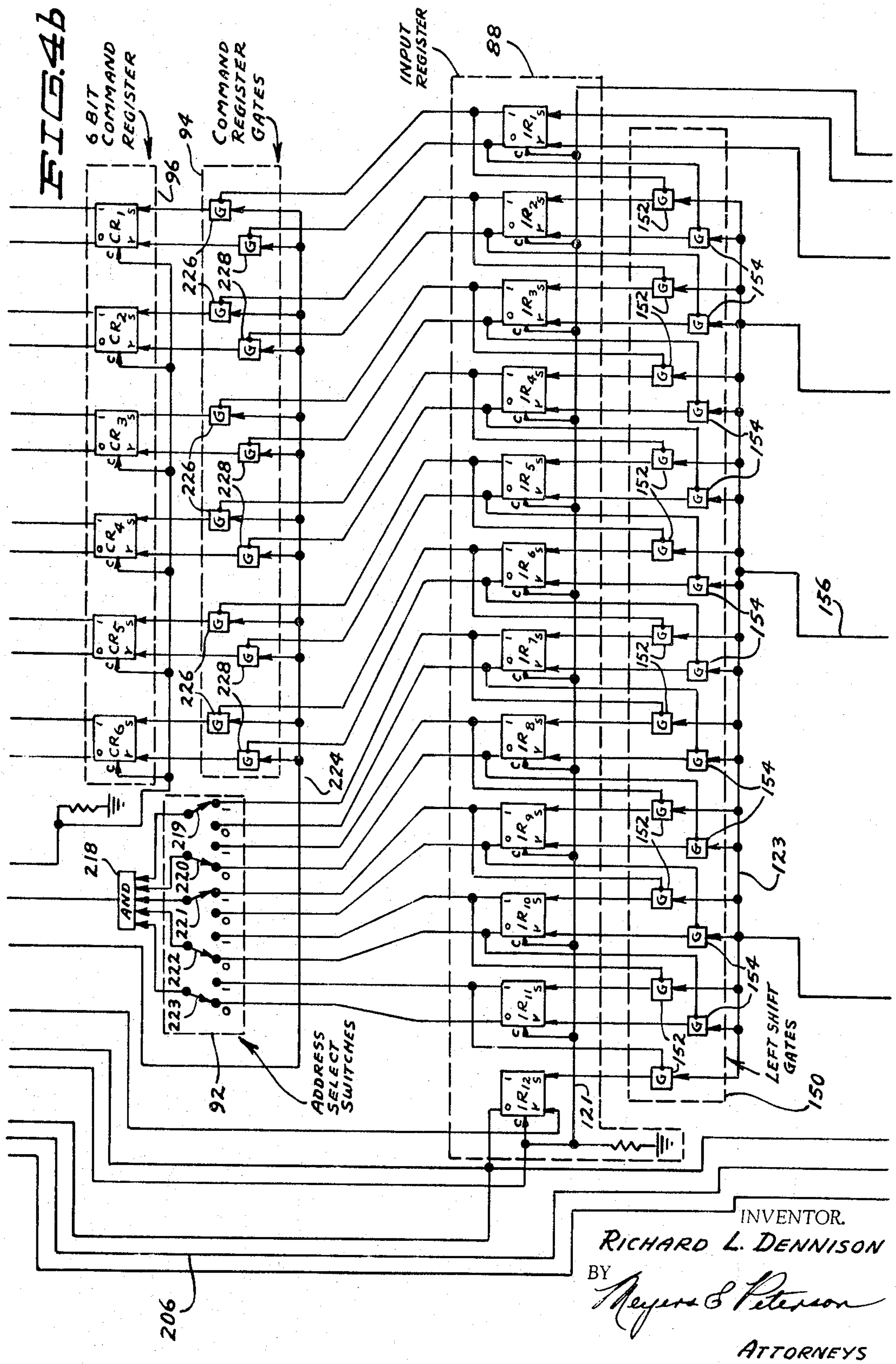
Figure 4C:
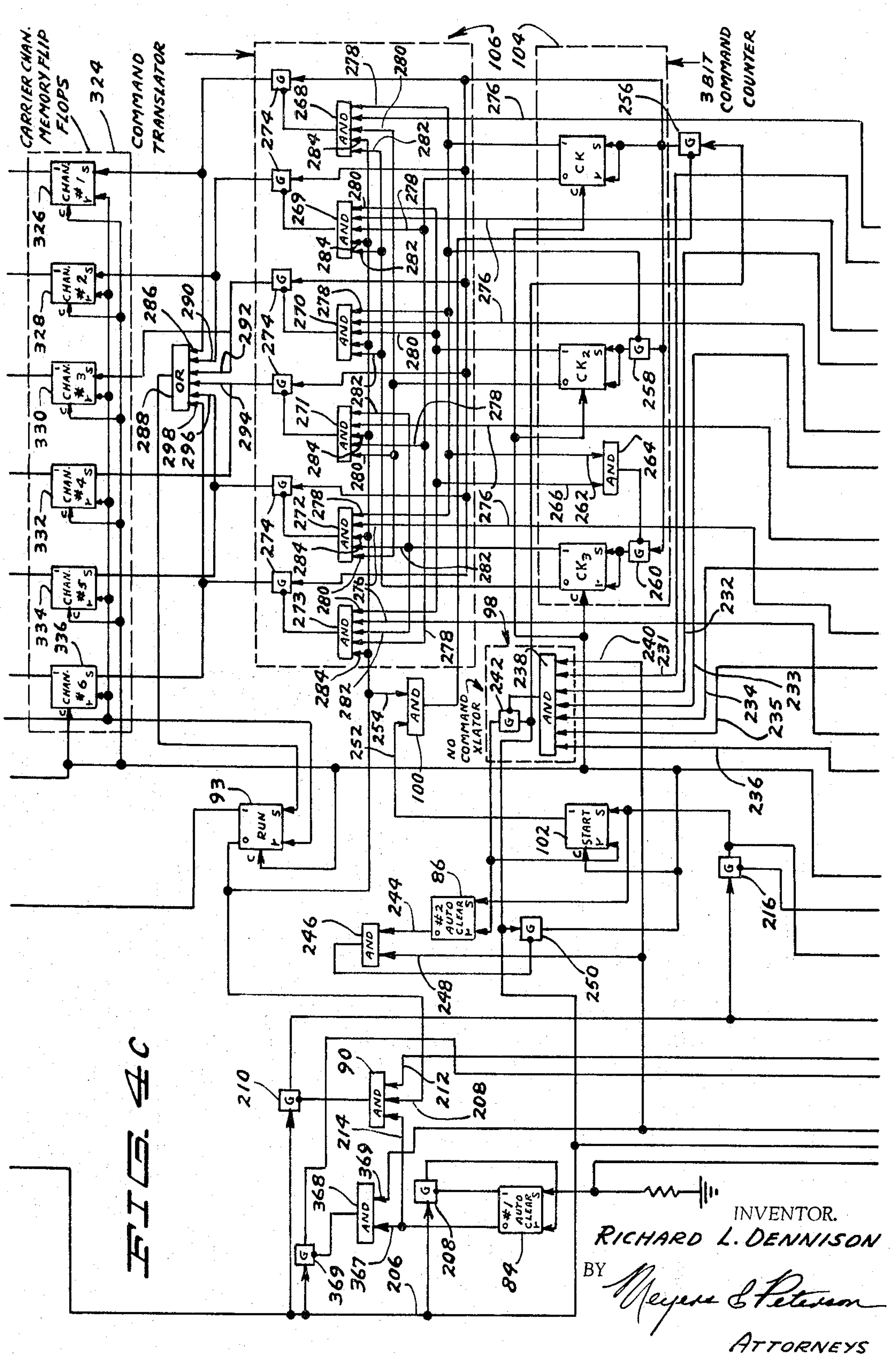
Figure 4D:
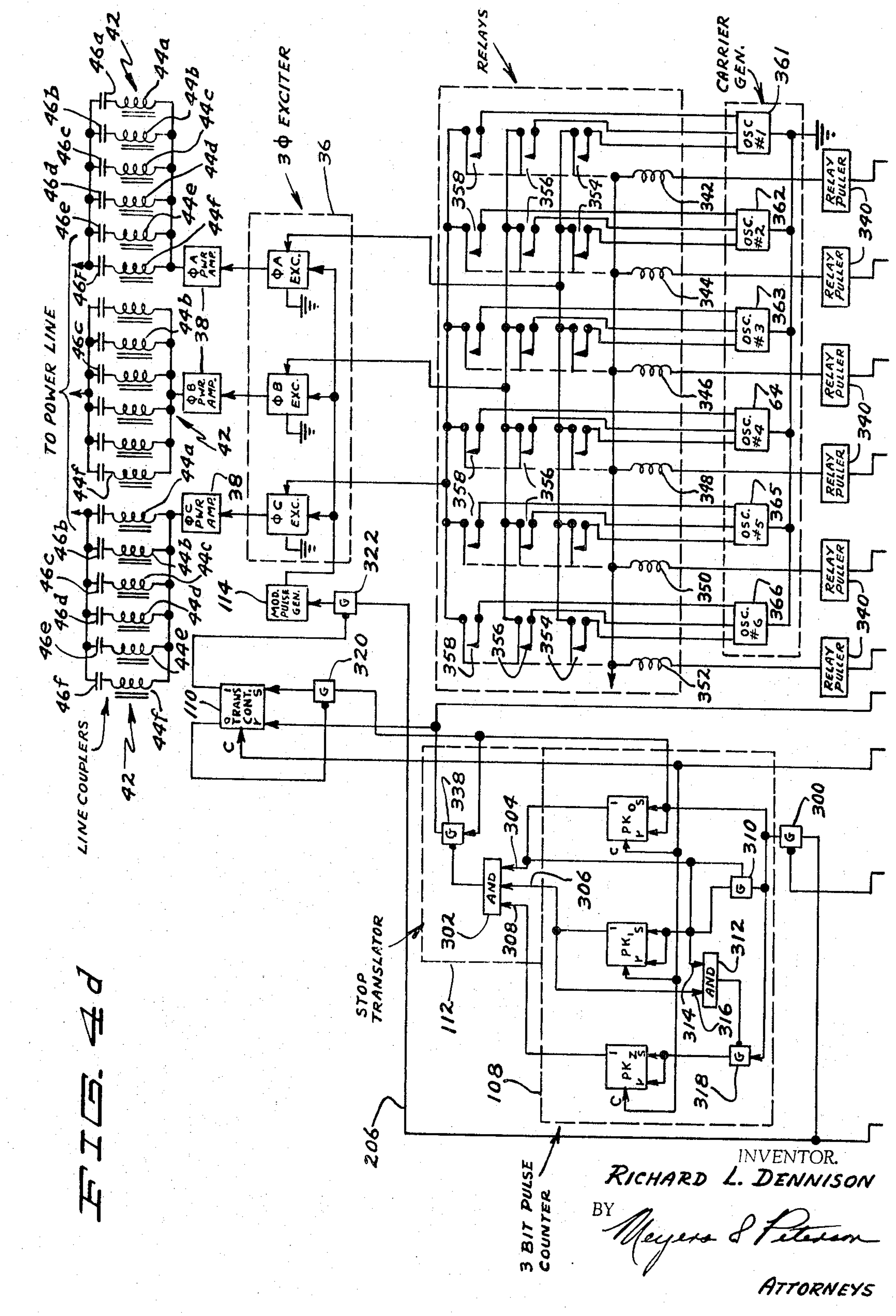
Figures 5, 6, 7, 8:
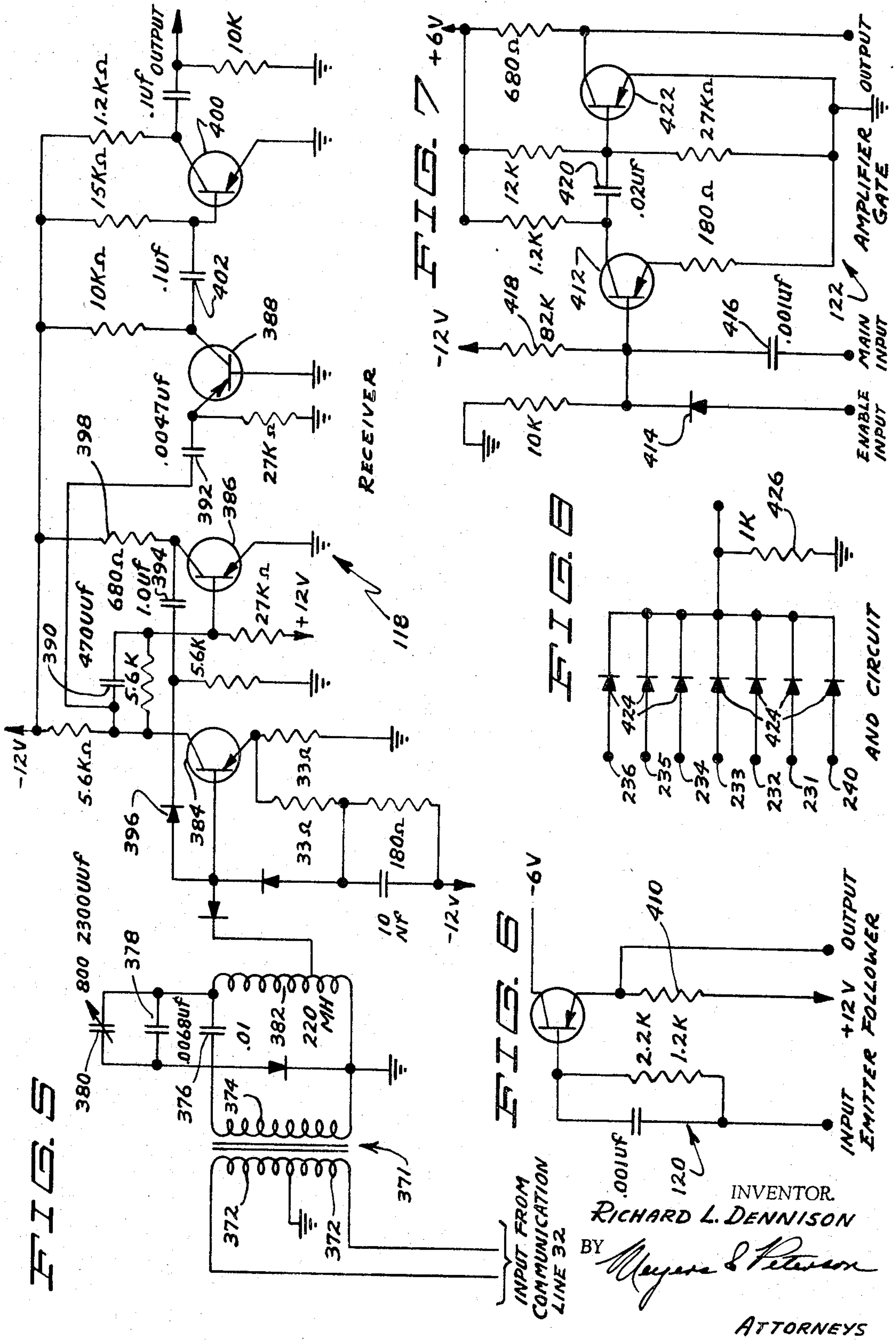
FIGURE 5 is a diagram in schematic form of the receiver used with the load control transmitter of FIGURES 2 and 4.
FIGURE 6 is a schematic representation of an emitter follower which can be utilized as one of a number of amplifiers within the load control transmitter.
FIGURE 7 is a schematic view of one of the amplifier gates, there being a relatively large number of such gates used in the construction of the load control transmitter.
FIGURE 8 is a schematic view of an AND circuit showing the diode arrangement constituting same.

From what has been said, it is believed obvious that the transmitter A detailed in FIGURE 4 will continue to transmit a group of seven power bursts containing the carrier frequency from the #1 oscillator 361, then in like fashion seven power bursts having the frequency of the oscillator 364 therein, then seven power bursts having the frequency of the oscillator 365, and then a continued repetition of these groups of seven power bursts each until a new command is presented to the receiver 118 (FIGURE 4*a*). In other words, there will be a continual interlacing of groups of pulses or bursts on channels 1, 4 and 5 with a repetition of same until a new command arrives. If it is desired to terminate the transmission of these bursts, then the new word would contain all 0's in the command portion thereof. For the particular transmitter A that we have been describing, the new word would be 100101000000. The 0's in the stages $IR_1$–$IR_6$ of the input register 88 would be translated into the 6-bit command register 96 and inasmuch as this would be interpreted as a no command, the AND circuit 238 and its associated gate 242 constituting the no command translator 98 would cause a clock pulse to be forwarded through this gate 242 to the input terminal *r* of the #2 auto clear flip-flop circuit 86, that is, to the 0 side thereof to cause energization of both of the inputs 244 and 248 of the AND circuit 246 and an attendant opening of the gate 250 having connection with the various clearing terminals *c* of the flip-flops illustrated in FIGURES 4*c* and 4*d*. The #1 auto clear flip-flop circuit 84, of course, clears the various flip-flops on FIGURES 4*a* and 4*b* within its control in the same fashion that it does with any command in the instruction word.

*Details of the receiver that is part of the transmitter*

Although for the most part, persons familiar with the design of logic circuits will appreciate what is needed in each instance especially since the components described herein are all basically of conventional design and may be found in various patents and technical literature, nonetheless certain schematics have been incorporated into the specification for the sake of completeness and for the purpose of making absolutely certain that there will be no misunderstanding as to what is required in the way of practical circuitry.

Figure 19:
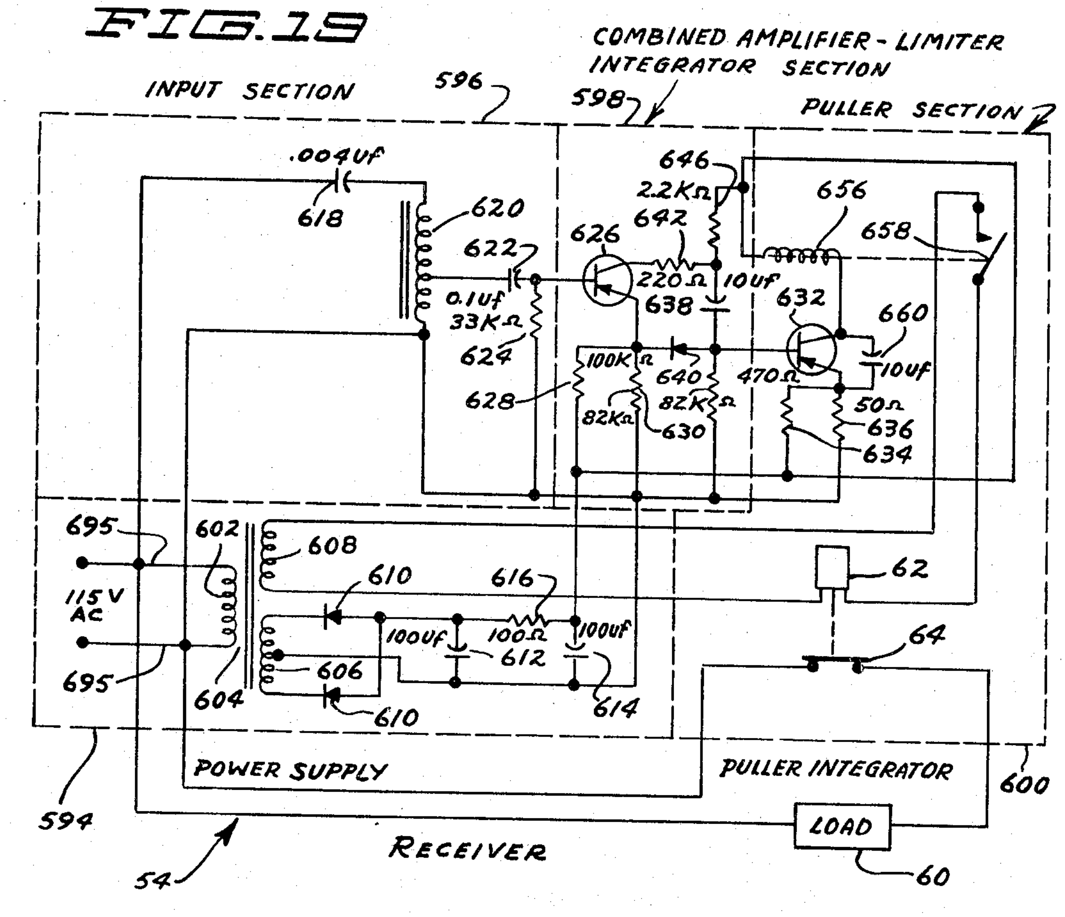
FIGURE 19 is a schematic view of one of the receivers located at the distribution end of a power line.

Accordingly, attention is directed at this time to the receiver 118 portrayed in FIGURE 5, not to be confused with the receivers 54, 56 and 58 yet to be described in detail and which are shown at the right in FIGURE 1 and one of which is schematically diagrammed in FIGURE 19 still to be referred to. The receiver 118 shown in FIGURE 5 is designed with a circuit impedance of 600 ohms at a frequency of 2500 cycles per second in order to match the impedance of the telephone circuits constituting the communication line 32. The input signal coming from the terminal equipment is composed of sequential bursts having a 2500 c.p.s. carrier frequency with the time relationships corresponding to the earlier mentioned sync pulses, the 1 pulses and also the 0 pulses displayed in FIGURE 3. As already indicated, such pulses may be produced by punched or magnetic tape constituting part of the terminal equipment 30.

Describing now the receiver 118 of FIGURE 5 in detail, a transformer 371 is employed having its primary winding 372 connected so as to receive the sync, the 1 and the 0 pulses as they arrive via the communication line 32. The secondary winding 374 of the transformer 370 is resonated at 2500 c.p.s. using a pair of parallel capacitors 376 and 378 shunted by a padder 380. The inductive portion of the network with which the capacitors 376, 378 and 380 are associated has been denoted by a coil 382. It will be perceived that a conductor tapped to this coil leads to the base of a first transistor 384 which is of the PNP variety as are others yet to be referred to. The transistor 384 is normally biased to cut off but conducts on the negative excursions of the signal impressed upon the base thereof. When the transistor 384 conducts, a positive increasing signal is produced at its collector which is forwarded to two additional transistors labeled 386 and 388 via coupling capacitors 390 and 392, respectively.

The transistor 386 is an integral part of a regenerative circuit. In this regard, any sufficiently negative signal delivered to its base will be inverted and fed back via a capacitor 394 through a diode 396 to the base of the first transistor 384, thereby aiding the input signal. The emitter of the second transistor 386 is grounded and it is to be observed that the collector has a resistor 398 in circuit therewith which is connected to a negative potential, whereby the feedback signal is of a negative character. At any rate, it will be readily understood that the signal is in this way amplified.

The third transistor, denoted by the reference numeral 388, is a part of a differentiator circuit. The positive pulses delivered to its emitter are changed to positive spikes on the collector thereof. As is conventional with a common base configuration for transistors, no phase reversal takes place.

The output stage of the receiver 118, includes a transistor 400 which receives the positive spikes by way of a coupling capacitor 402 and by reason of the inherent inversion that takes place, a sharp negative excursion or pulse is forwarded to the amplifier 120 of FIGURE *4a*, more specifically an amplifier employing the emitter-follower principle described in conjunction with FIGURE 6.

Consequently, the receiver of FIGURE 5 accepts the various pulse signals coming from the terminal equipment 30 over the communication line 32 and produces a single sharp negative spike for each such burst. In other words, the incoming signals are demodulated and negative D-C pulses are produced in their stead, although the derived pulses have not been distinguished from the original pulses in describing in FIGURE 4, it having been simpler and more convenient not to make a distinction.

*Typical amplifier used for isolation purposes throughout logic circuitry*

The second component to be referred to is the emitter follower which is used for purposes of isolation at various locations throughout FIGURE 4. Such an amplifier, more precisely a current amplifier, has been denoted by the reference numeral 120, but others could be utilized. This emitter follower type of amplifier includes a PNP transistor 404 having its base connected to the appropriate input via a parallel resistor-capacitor combination 406, 408. The transistor 404 is rendered conductive when the base is made sufficiently negative and a flow of current through an emitter resistor 410 will provide the output signal from a point therebetween. The advantage of an emitter follower for amplifying purposes is that a number of these devices can be paralleled across a given output from another device without loading the circuit down, thereby making it possible to drive many more inputs to other devices than certain other conventional circuits could handle. The emitter follower arrangement also provides excellent isolation between input and output circuits.

*Gate*

Although various types of gates can be used, the gate 122 diagrammed in FIGURE 7 will now be described, as it is typical of the various gates that have herein been referred to. This circuit is actually an amplifier gate and has two inputs to the base of a PNP transistor 412. One of the inputs is via a diode 414 and it is to be considered as providing an arming or enabling terminal. The other input, which has been termed main input to distinguish same from the enable input, is connected to the base of this transistor 412 through a capacitor 416. The transistor 412 is normally held in a non-conductive state by reason of a positive potential applied to the base through a base resistor 418. The gate 122 is considered to be closed whenever the bias on the base is at a sufficient potential to keep the transistor 412 from conducting. Hence, whenever a sufficiently positive signal is applied to the enable input terminal, the positive condition of the base will be maintained owing to the direction in which the diode 414 is oriented. Should a negative pulse be applied to both of the input terminals, that is, the enable and main input terminals, then a potential applied to the main input with the capacitor 416 in circuit therewith will apply a sufficient negative bias to the base of the transistor 412 to cause conduction thereof and the gate 122 is considered to be open or enabled so that the pulse delivered to the main input will propagate therethrough. What occurs is that conduction of the transistor 412 due to a negative pulse applied to the terminal in circuit with the capacitor 416 will cause a coupling capacitor 420 to be charged and this affects the base bias of a second transistor 422 which serves as an amplifier and at the same time as an inverter inasmuch as it reinverts the signal applied to the main input terminal. Thus, when two sufficiently negative potentials are applied to the two input terminals, an amplified negative pulse will be available at the output of the gate 122. The signal applied at the enabling terminal can be ground or anything more negative. This will be obvious when considering the particular AND circuit shown in FIGURE 8. Because of its isolating capabilities, the gate just described can also be employed as an amplifier in the manner contemplated for the emitter follower shown in FIGURE 6, it being only necessary to apply a continuing ground or a signal more negative than ground to the enabling terminal.

*"AND" circuit*

In FIGURE 8 a diode AND circuit corresponding to the AND circuit designated by the numeral 238 is set forth, the reason for selecting the particular AND circuit is that it has the greatest number of inputs of any AND circuit used in the load control transmitter. Hence, it will be discerned that seven diodes 424 are employed and that the cathodes thereof are joined or commoned together and serve as the output side, a resistor 426 being connected between the output side and ground. Inasmuch as the circuitry selected for illustrative purposes may be considered to use a negative voltage to indicate either the 0 or 1 state of the various flip-flops of FIGURE 4 and a corresponding positive voltage that exists at the other side of the flip-flop which is to be considered as its unswitched state (discussed more fully with regard to FIGURE 14), then it follows that when a negative voltage is applied to all seven inputs 231–236 and 240 leading to the diodes 424 then all of the diodes are back or reversed biased, that is, cut off, and the output is at ground potential due to the resistor 426. On the other hand, should any of the inputs have a positive potential of ten volts applied thereto, then the output will be clamped to this positive voltage and the AND circuit 238 is not completed. In other words, for our purposes it will be understood that there is no output, it being necessary that all of the inputs to be AND circuit be activated or energized with the minus five volt potential that has been selected.

*Sync blanking generator and also modulator pulse generator*

Figure 9:
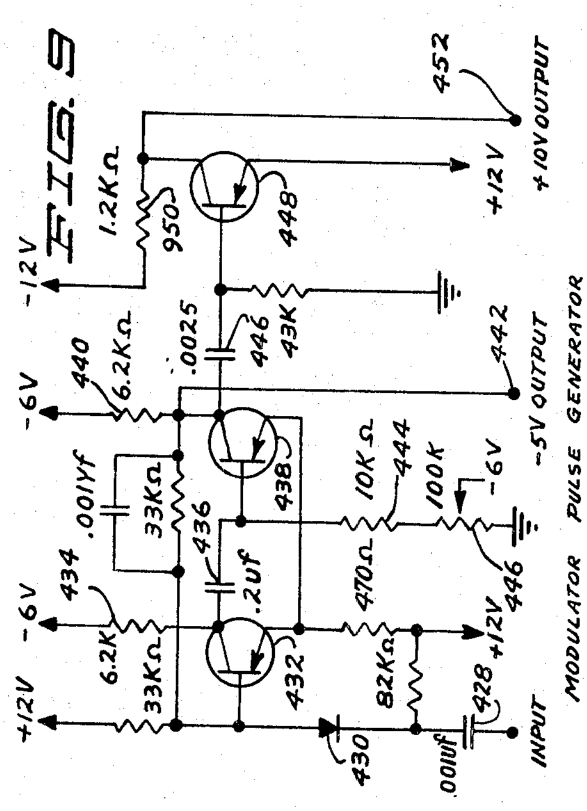
FIGURE 9 is a schematic view of one of the one-shot multivibrators employed in the load control transmitter.

In previous portions of the description, reference was made to two one-shot multivibrators, these being the sync blanking generator 134 and the modulator pulse generator 114. FIGURE 9 diagrammatically shows a one-shot multivibrator that can be used in either situation with but slight modification. Accordingly, it is to be noted that a negative pulse or spike is applied to an input terminal and is coupled through a capacitor 428 and diode 430 to the base of a first PNP transistor 432, this negative spike or pulse turning on this particular transistor. Owing to the conduction that takes place with respect to the transistor 432 its collector will become more positive due to flow of current through the collector resistor labeled 434. This more positive signal is coupled via a capacitor 436 to the base of a second transistor 438, thereby cutting the second transistor 438 off due to the more positive bias applied to its base. When the transistor 438 is cut off, then its collector resistor 440, which is connected to a negative potential, applies a negative potential to the output terminal denoted as 442. This arrangement pertains exclusively to the modulator pulse generator 114 and in this connection it is to be pointed out that a base resistor 444 associated with the base of the second transistor 438 will have a relatively high ohmic value, say 25,000 ohms, since a relatively short negative pulse period is desired in conjunction with the application of pulses to the three-phase exciter 36 (detailed in FIGURE 17).

With respect to the sync blanking generator 134, though, the situation is somewhat different inasmuch as we want a positive output to be applied through the AND circuit 124 (FIGURE 4*a*), this AND circuit having four inputs 126, 128, 130, 132 which must all be negative in order to have an output signal delivered to the enabling terminal of the sync gate 122. Consequently, the resistor 444 in the base circuit of the second transistor 438 would be much lower under these circumstances, say, 10,000 ohms, and in order to provide means for adjusting the ultimate output signal as far as its width is concerned, a potentiometer 446 is connected in circuit with the base resistor 444 of decreased ohmic value. Because a positive output is needed in conjunction with the input of the AND gate 124, an inversion is provided in the form of a coupling capacitor 446 connected to the base of a third transistor 448. Hence, when the second transistor is turned off, then the base of the third transistor 448 becomes sufficiently negative so as to cause conduction of said third transistor. Due to the fact that the collector of the transistor 448 is connected to a negative potential through a collector resistor 450 and the emitter of this transistor to a positive potential, it follows that the collector becomes more positive under conduction and this positive output is used in conjunction with the disabling of the AND circuit 124 by way of a terminal 452 to which the collector of the third transistor 448 is connected.

Thus, it will be appreciated that the one-shot multivibrator shown in FIGURE 9 is actually two circuits but have been combined for drafting simplicity, it being obvious that the terminal 442 is used in connection with the modulator pulse generator version and the terminal 452 with respect to the sync blanking generator embodiment. In both cases the coupling capacitor 436 between the two transistors 432 and 438 is charged and does not immediately return to its original condition and this state of affairs causes a continued positive signal to be applied to the base of the second transistor 438. Obviously, the amount of resistance in the base circuit is determined by the resistor 444 (and the potentiometer 446 in the case of the sync blanking generator adaptation) will determine the time constants of the circuit and the width of the output so derived.

*Typical "OR" circuit*

Figure 10:
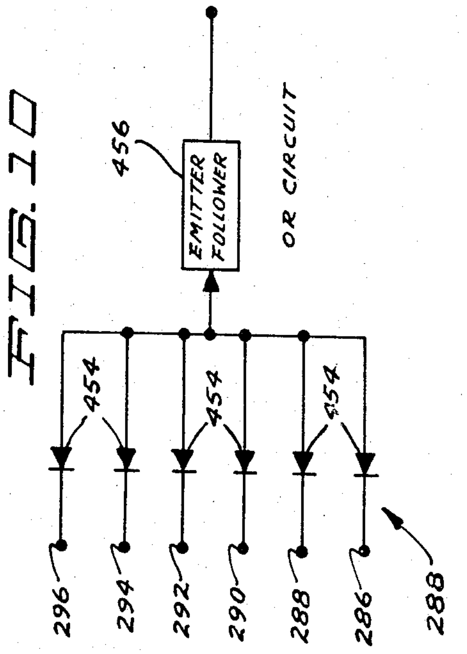
FIGURES 10 and 11 represent in a diagrammatic fashion two different types of OR circuits employed in the designing of the transmitter.

Referring now to FIGURE 10 where one suggested form of OR circuitry is set forth, it will be noted that the OR circuit labeled 288 has been selected for illustration inasmuch as it has the largest number of inputs of any of the OR circuits that have been referred to in FIGURE 4. In the illustrated arrangement, it is to be observed that the input terminals 286–296 are attached to the cathodes of various diodes 454. In this situation a positive pulse applied to any of the inputs 286–296 of the OR circuit 288 will not get through because of the high resistance offered by the reverse connection of the diodes. However, a negative signal applied to any one of the inputs will automatically cause the joined ends of the diodes 454 to be more negative than they were before a negative input signal was applied to any one of the cathodes of the diodes. In order to render the resulting signal usable in the circuitry that has been described, an emitter follower 456, such as that shown in FIGURE 6 would be used for amplification purposes. This is believed readily understandable by those familiar with the art.

*Alternative "OR" circuit*

Figure 11:
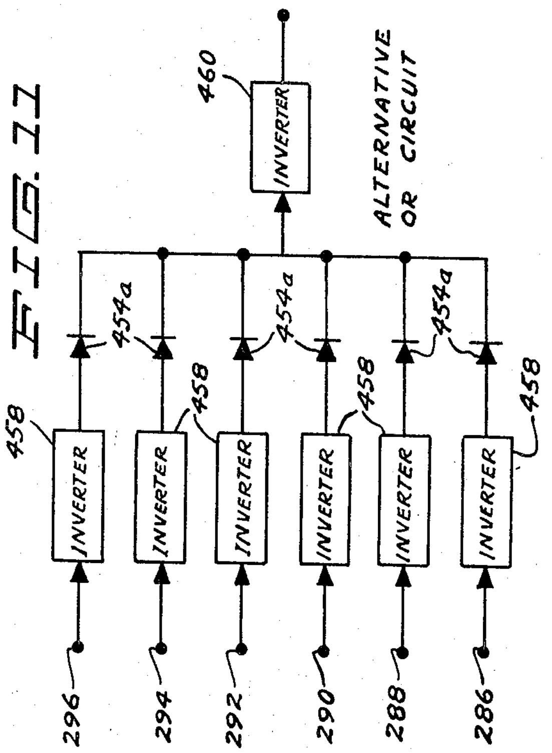
Figure 12:
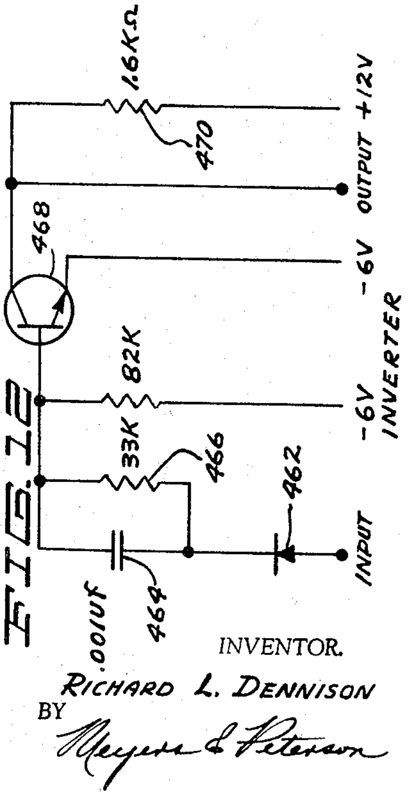
FIGURE 12 is a schematic view of one of the inverters used in FIGURE 11 and also in other of the circuits.

An alternative OR circuit that might be employed is shown in FIGURE 11. Here a group of six inverters 458, such as that shown in FIGURE 12, is utilized and the output sides of these inverters are connected to the anodes of six diodes **454*a*, the diodes being reversed from those depicted in FIGURE 10. The cathodes are commoned and connected to another inverter 460, so that when a negative signal is applied to any of the six inverters 458, there will be a positive output impressed on the anode of the diode connected thereto with the consequence that the inverter 460** serving all of the diodes has a positive potential applied to its input. This results in a negative output from the last inverter by reason of the inversion that takes place. Hence, a negative signal on any of the inputs of the OR circuit will result in a negative output.

*Inverter*

Inasmuch as the inverters 458 and 460 have been mentioned in connected with FIGURE 11, one such inverter will now be described. When a positive voltage is applied to the input, it will be coupled through a diode 462 and capacitor-resistor combination 464, 466 to the base of an NPN transistor 468. Since the transistor 468 is an NPN type, the positive voltage forward biases the transistor and causes it to conduct. The increased current flow through the transistor 468 and its collector resistor 470 causes the collector voltage to go negative. This negative collector voltage is the output. From the foregoing it can be seen that a positive D-C input produces a negative D-C output. On the other hand, a negative D-C voltage applied to the input has no effect since the diode 462 is under these circumstances reverse-biased. Consequently, the transistor 468 remains cut off and its collector voltage stays at approximately the positive supply voltage which has been shown as plus twelve volts. Therefore, a negative D-C input voltage produces a positive D-C output voltage.

*Receiver "0" and receiver "1" gates*

Figure 13:
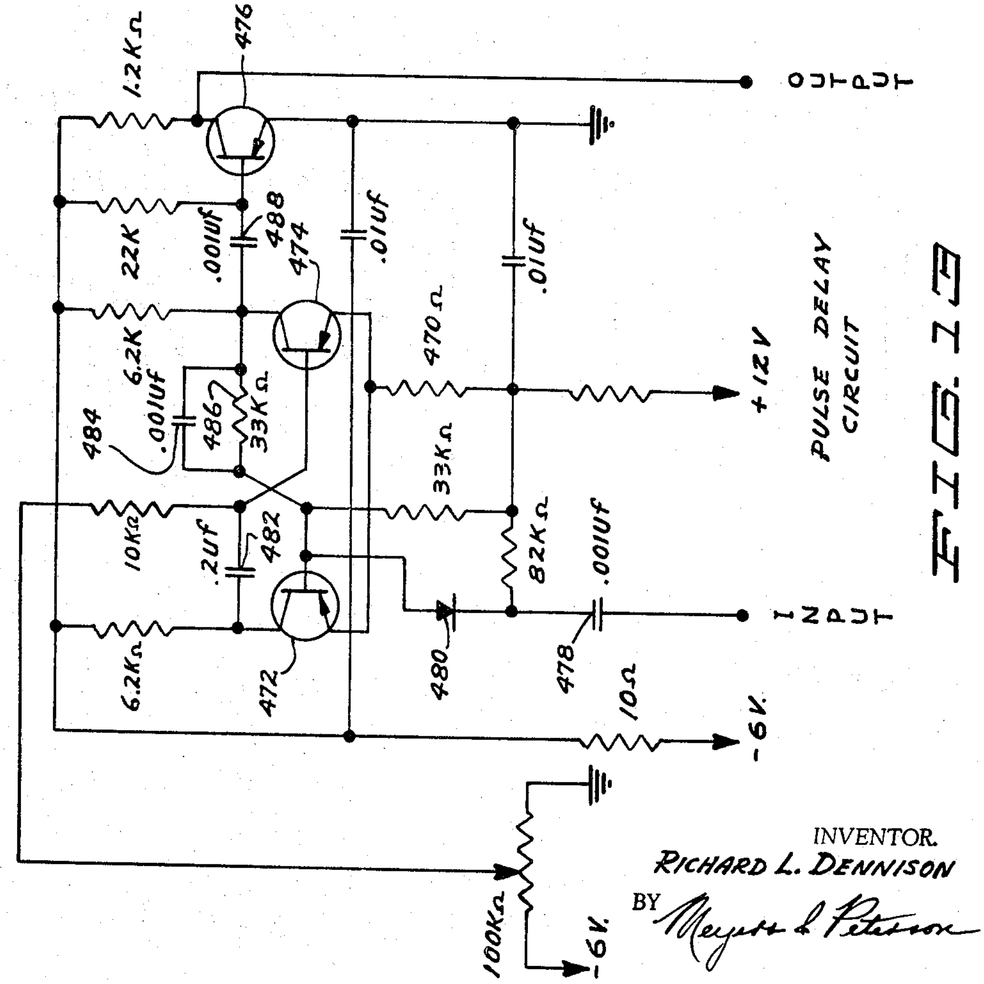
FIGURE 13 is a diagram of a pulse delay circuit constituting one of two time delay gates used in the load control transmitter.

Closely resembling the circuit of FIGURE 9 is the pulse delay circuitry illustrated in FIGURE 13. The circuit of FIGURE 13 corresponds to the construction used in the receiver 0 and the receiver 1 gates of FIGURE 4*a* that have been previously assigned the reference numerals 158 and 160. There is of course a difference in the timing of the delayed output from the receiver 0 gate 158 as compared with the receiver 1 gate 160 but this is easily achieved by selecting the appropriate circuit parameters. Referring in detail to FIGURE 13, two transistors 472 and 474 constitute the one-shot multivibrator providing the desired pulse delay. A third transistor 476 serves as the output transistor and provides amplification as well as phase inversion. When a negative pulse, such pulse having been selected as minus five volts, is applied to the base of the first transistor 472 through a capacitor 478 and diode 480, this particular transistor conducts. As soon as the input pulse starts the first transistor conducting, a capacitor 482 in its collector circuit begins charging toward a negative value and the time that it takes for this to occur determines the pulse delay time in conjunction with the setting of a control potentiometer 484 and a resistor 486 in circuit therewith. When the capacitor 482 has charged sufficiently to provide a negative bias on the base of the second transistor 474, this second transistor will begin to conduct. In conventional fashion, its positive collector potential, caused by the conduction thereof, is coupled back to the base of the first transistor 472 via a capacitor-resistor combination 484, 486 and will cause the first transistor 472 to cut off. The one-shot multivibrator portion of the circuit is now in its original condition. However, the positive collector voltage of the second transistor 474 is coupled via a capacitor 488 to the base of the third transistor 476. The signal so transmitted to the third transistor 476 is in the form of an inverted output signal, a negative five volts. Hence, the circuitry of FIGURE 13 will present a delayed negative output pulse which is processed as earlier described.

*Flip-flop circuit*

Although flip-flop circuits are widely used in present day logic circuitry design, nonetheless it is well to have a full comprehension of the elements constituting a given flip-flop circuit in this instance, especially inasmuch as so many flip-flop circuits are utilized in the transmitter. Additionally, it will be of assistance in providing a complete understanding of the transmitter operation if the various potentials are kept in mind when examining the flip-flop circuit of FIGURE 14. As the description progressed, constant use was made of the 1 or set condition of a flip-flop circuit and also its 0 or reset condition. In connection with FIGURE 14, it will be observed that the #1 auto clear flip-flop circuit 84 has been selected and that two transistors 490, 492 are utilized. The 1 or set state is denoted when the lefthand transistor 490 is cut off, the righthand transistor 492 then being conductive, and the 0 or reset state is denoted when the lefthand transistor 490 is conducting, the righthand transistor 492 then being cut off.

When a negative input pulse (minus five volts) is applied to what has been termed an input terminal *s* at the 1 side of the flip-flop circuit 84, the voltage so applied causes a negative signal to be applied to the base of the righthand transistor 492, this circuit being established through a diode 494, a capacitor 496 and a second diode 498. Being a PNP type transistor, the transistor 492 is turned on or conducts heavily. With the transistor 492 conducting heavily, the drop across its collector resistor 500 causes the collector to go positive. This positive potential is coupled through a resistance-capacitance network collectively denoted by the reference numeral 502 to the base of the lefthand transistor 490. The positive voltage so impressed on the base of the lefthand transistor 490 cuts off this particular transistor, and its collector goes negative due to its connection to a negative supply voltage. Consequently, a negative signal is applied to the output terminal at the 1 side of the flip-flop circuit 84. Should the flip-flop circuit already be in its 1 or set condition, then the flip-flop will not change its state.

Considering now what occurs when a negative input pulse is applied to the input terminal *r* at the 0 side of the flip-flop circuit, the potential will be felt on the base of the lefthand transistor 490 and the negative bias thus applied will turn this transistor on. Increased conduction through the transistor 490 and its collector resistor 504 causes the collector thereof to go positive. The positive voltage so realized is coupled through a resistance-capacitance network 506 to the base of the righthand transistor 492, thereby causing the righthand transistor to be turned off. The collector voltage of the now turned off transistor 492 will be negative, for the supply voltage is of a minus six volt magnitude. This negative voltage is applied directly to the output terminal at the 0 side of the flip-flop circuit 84.

As is inherent in a flip-flop circuit design, one side, more specifically one transistor, is conducting, and during such a period the other side must be cut off in all cases.

Figure 14:
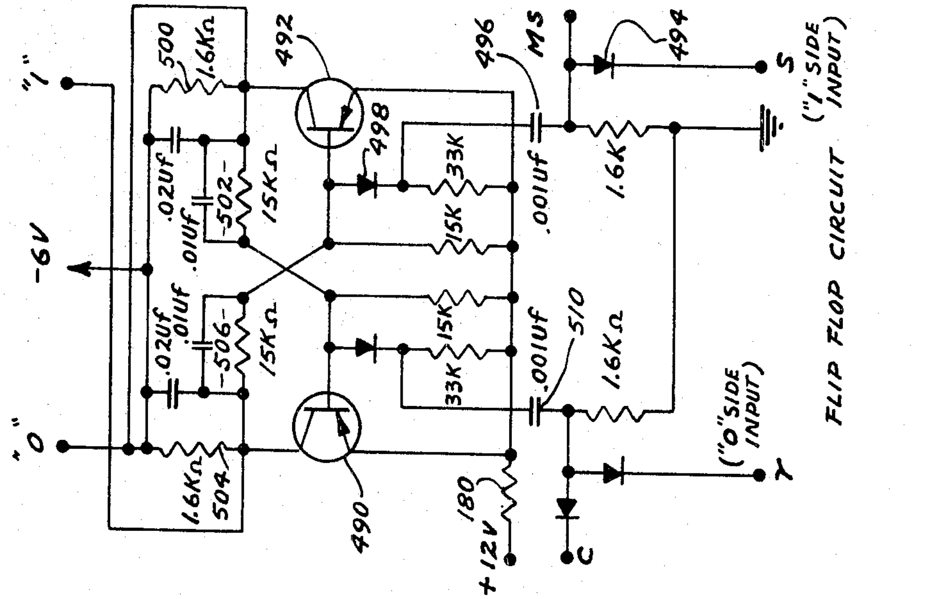
FIGURE 14 is a schematic view of a typical flip-flop circuit, there being a relatively large number of such flip-flops used in the various registers, counters and other selection circuitry associated with the load control transmitter.

In connection with the description of the #1 and #2 auto clear flip-flop circuits 84, 86, the clearing action derived from these two circuits was described, although not in great detail. Inasmuch as the flip-flop circuit 84 of FIGURE 14 is being referred to rather specifically, the clear terminal *c* at the left side will be described. All this does is set the flip-flop to its 0 state and to accomplish this it will be observed that a negative voltage is applied to this clear terminal and that this signal traverses a path through a diode 508 which is connected to a capacitor 510 corresponding in function to the capacitor 496 at the right. Thus, in clearing the flip-flop circuit 84, the clearing action is the same as a resetting one.

What has not been referred to is the fact that each flip-flop has provision for manually setting the flip-flop to its 1 state. Hereagain, this is conventional with respect to flip-flop design and had not been mentioned up to this point because very little use will be needed for such a feature in the present system. Nonetheless, a set terminal labeled *ms* has been shown in FIGURE 14 and a negative voltage applied to this terminal will be impressed on the capacitor 496 that has already been referred to. The action that transpires is identical to that which occurs when a negative signal is applied to the input terminal labeled *s*.

*Three-phase oscillator*

Figure 15:
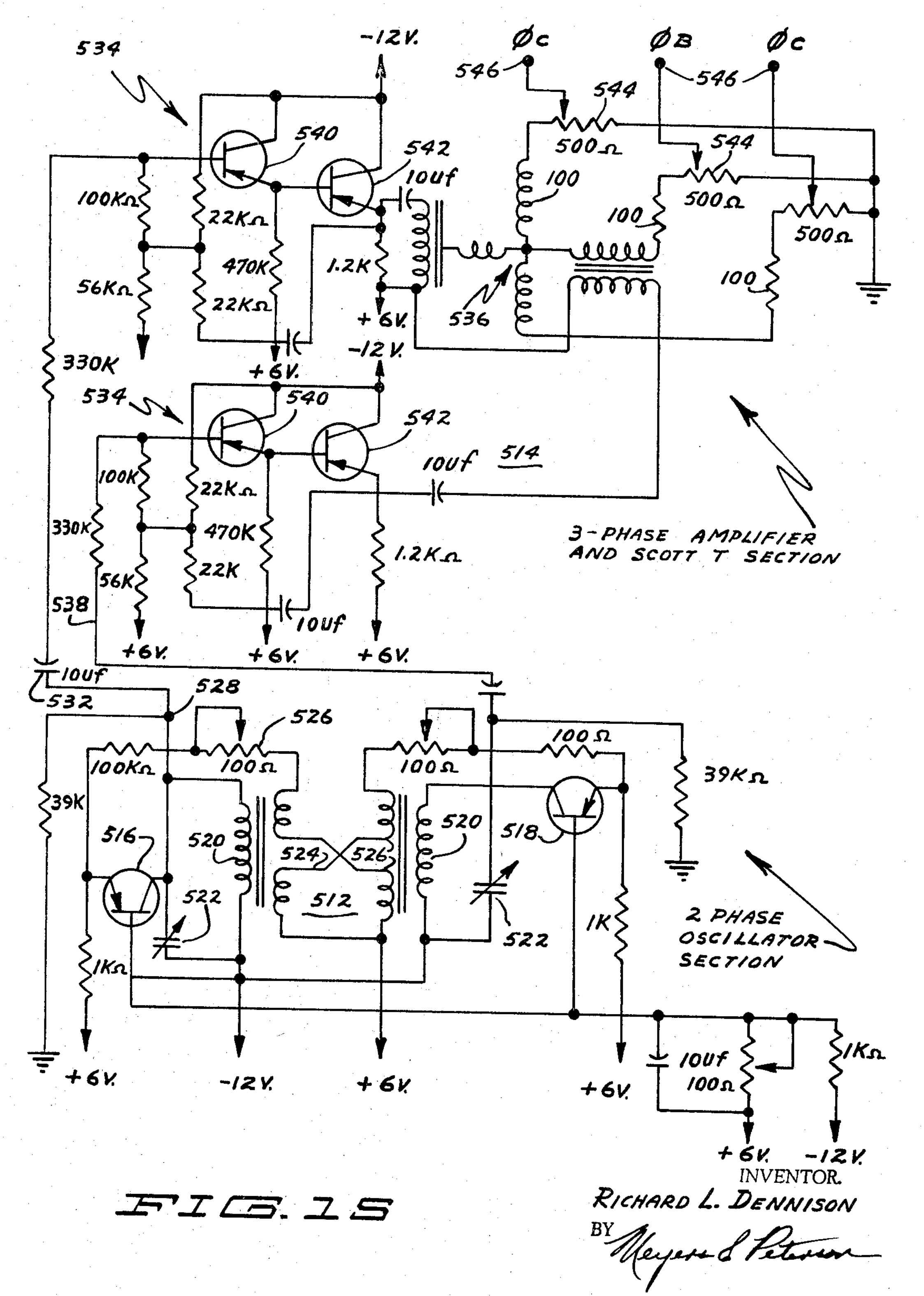
FIGURE 15 is a schematic view of one of the oscillators shown in FIGURE 4, this circuit including means for first generating a two-phase signal and means for thereafter converting this signal to a three-phase carrier signal.

Heretofore reference has been made to six three-phase oscillators 361–366 (FIGURE 4*d*) and one of these oscillators is shown schematically in FIGURE 15. For simplicity of description, the oscillator circuitry has been divided into two sections 512, 514, one section being designated a two phase oscillator and the other section a three phase amplifier and Scott T configuration. In the portion 512 of the circuit labeled two phase oscillator, it will be seen that two transistors 516, 518 are employed and that each is embodied in conventional Hartley type L–C oscillator. The inductance has been labeled 520 and the capacitor has been labeled 522. Both of the oscillators constituting the two phase oscillators 512 are tuned to the same frequency and both share parts of their feedback windings bearing the reference numeral 524 with the other. This serves to lock the two single-phase oscillator signals 90 degrees apart. A variable resistor 526 is associated with each single phase oscillator and can be adjusted so as to produce a desired amplitude at the points 528 and 530. The variable capacitors designated by the reference numeral 522 naturally control the frequency of the two Hartley oscillators. The signals thus produced by each individual oscillator of the two-phase oscillator 512 are coupled through capacitors 532 and the signals thus impressed onto the output terminals are in the form of sine waves having a 90-degree displacement.

Turning now to the other portion 514 of FIGURE 15, this relating to the three-phase conversion from the two-phase output from the oscillator 512. In order to provide a three-phase output, the two-phase signal is sent through two amplifiers 534, both of which are connected to a common Scott T output transformer 536. A separate conductor 538 is provided for each of the two phases and the amplifying stages are of the emitter follower variety (there being two such stages) to provide sufficient power gain to drive the primary windings of the output transformer. The two transistors 540, 542 constituting the two amplifying stages are connected in a manner such that the emitter of the second transistor 542 provides a regenerative feedback to increase the overall gain of the amplifier. The secondary windings on the Scott T transformer are merely wound so that the voltages induced are 120 degrees apart. The potentiometers 544, there being one across each secondary winding of the transformer 536, control the amplitudes of the output signals at the output terminals 546 without effecting the phase relationship of these signals.

*Relay puller*

Figure 16:
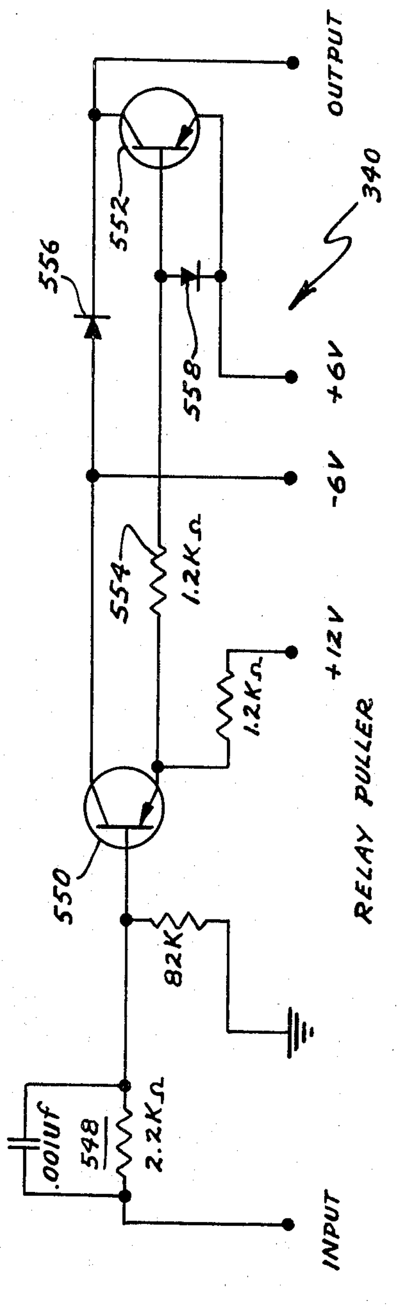
FIGURE 16 is a simple circuit arrangement of one of the relay pullers utilized for energizing one of a number of relays which may be considered to be associated with the oscillator of FIGURE 15.

One of the six relay pullers 340 will now be described, the circuitry constituting the puller being set forth in FIGURE 16. From FIGURE 4 it will be seen that these various relay pullers 340 are connected to the 1 side of the memory flip-flops 326–336 constituting the bank 324 of flip-flops. Thus, the relay pullers 340 must be brought into operation by a negative signal. The negative voltage, indicating a binary 1, is coupled through a resistance-capacitance network 548 to the base of a first PNP transistor 550, thereby causing this transistor to conduct. Since the transistor 550 is emitter-follower coupled to a second transistor 552, a negative voltage will also be applied to the base of the second transistor through a resistor 554. This causes the second or output transistor 552 to conduct heavily and since the relay associated with each relay puller 340 is in the collector circuit of its associated puller, the proper relay will be energized. It might be pointed out that a diode 556 connected between the collectors of the two transistors 550, 552 and another diode 558 between the base and emitter of the transistor are for transient suppression. More specifically, the presence of these two diodes 556, 558 in the relay puller circuitry reduces interference when the relay contacts 354, 356, 358 (FIGURE 4*d*) are opened and closed.

*Exciter*

The purpose of the exciter 36, one phase of which is portrayed in FIGURE 17, is to pass on a controlled basis the carrier frequency signals produced by the various oscillators 361–366. More specifically, its function is really a chopping one, as it blocks passage of a carrier signal at all times unless there is a pulse coming from the pulse generator 114. Hence, the input at terminal 359 to the single-phase exciter section of FIGURE 17 is an alternating current voltage at the particular carrier frequency that is to be transmitted and is impressed across the primary winding 560 of a transformer labeled 562. The carrier frequency signal from the secondary winding 564 of the transformer is coupled through parallel RC networks 566 to the bases of two transistors 568, 570. Connected to the RC networks 566 via a pair of diodes 572 is an input terminal 573 which connects to the output side of the modulator pulse generator 114. If no voltage or a negative voltage (we have selected a negative pulse as the output signal from the pulse generator 114) is present at the input 573, the two transistors 568, 570 will conduct on alternate half cycles to energize the primary winding 574 of a second transformer 576 in accordance with the particular frequency of the carrier frequency and hence provide an output across the secondary 578 of this second transformer. The secondary winding is connected to an output terminal 580 which in turn is connected to one of the single-phase power amplifiers 38. The action of the two transistors 568, 570 as far as their conduction on alternate half cycles is concerned is of the conventional push-pull character, the output signal thereby being a replica of the input signal. As previously explained, the width of the pulses from the pulse generator 114 is only five milliseconds; hence the output at the terminal 580 will be for only this period of time.

If a positive voltage is present at the input, the diodes 572 will be forward-biased so as to allow this positive potential to be applied to the bases of the transistors 568, 570. This action cuts off both transistors and no signal can then get through to the output.

While various frequencies can be selected for the carrier, and actually there are six different carrier frequencies in the illustrated case, it should be pointed out at this time once again that a frequency somewhere near 17 kilocycles per second has been found satisfactory as the average or mean frequency.

*Power amplifier*

Figure 18:
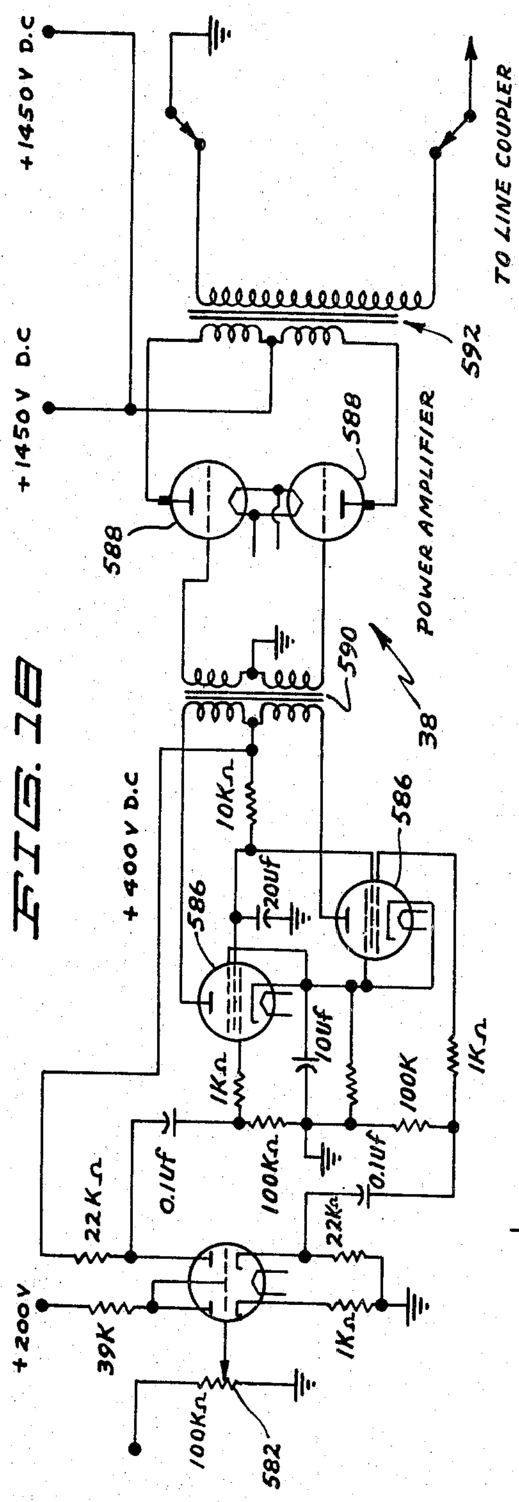
FIGURE 18 is a schematic representation of a typical power amplifier with the power supply and plate regulation sections omitted.

Of all the schematic circuits herein presented, possibly the circuit of FIGURE 18 could most easily be dispensed with. Each single-phase amplifier should be capable of furnishing an output of about 300–400 watts, though. The selected circuit depicts a suitable power amplifier 38, doing so in only a partial manner. More specifically, the power amplifiers that will be used would each include a power supply section, a B+ control regulation section, and a signal amplification section. Only the signal amplification section is shown and it will be assumed that an appropriate filament and plate supply are made available. According to what has been shown on FIGURE 18, a potentiometer 582 is connected to the output from one phase of the three phase exciter 36. The voltage thus produced on the wiper arm of the potentiometer 582 is impressed on the grids of a twin triode tube 584, such as a 6SN7 tube, the sections of which are connected in cascade. The plate and cathode of the second half of the twin triode 584, the twin triode functioning as a preamplifier, are connected to a pair of pentode tubes 586, such as those designated as type 5881, and the push-pull operation of these pentode tubes 586 provides enough signal power to drive a pair of output triode tubes 588, such as type 811A, the drive taking place through a transformer denoted by the reference numeral 590. The push-pull operation of the pentode tubes 586 provides approximately 200 watts of peak power to the line couplers 42, the secondary winding of a second transformer 592 being connected to one such line coupler 42 which has already been referred to.

*Method of transmission*

A rather elaborate description has now been completed with respect to the load control transmitter. With the information that has been presented in mind, it is felt that an understanding can now be had as to how each of the receivers 54, 56, 58 function. These receivers have been generally referred to as being tuned to various frequencies. For the sake of discussion, it will be assumed that the receivers denoted by the reference numeral 54 on FIGURE 1 are tuned to the carrier frequency that has been generated by the oscillator 361, this having been indicated to be 12 kc. for the sake of illustration. This is a three-phase oscillator, as are the other oscillators 362–366 and it has already been stated that it is used for producing the carrier signals which are superimposed onto the power lines 40 in the form of discrete power bursts. The pulse generator 114 puts out groups of seven pulses, because it is triggered seven times during each group interval. Inasmuch as as many as six channels can be employed for the transmission of information from the transmitter of FIGURE 4, which transmitter has been indicated by the letter A in FIGURE 1, it will be understood that when all six channels are to be utilized then there will be six pulse or power burst groups, each group including seven pulses or bursts of the appropriate frequency.

Concerning ourselves for the moment with only the bursts formed from the carrier frequency generated by the oscillators 361, the receivers 54 receive these pulses or burst groupings and because of their tuned characteristics will respond only to these particular bursts.

*Receiver at load end*

The manner in which the bursts are handled at the receiving end can be better understood by referring at this time in detail to what is presented in FIGURE 19. The particular circuit exemplifying a typical receiver includes a power supply 594, an input section 596 and a combined amplifier-limiter-integrator section 598 and a relay puller integrator section 600. For completeness, one of the relays 62 has been shown with its normally closed contacts 64 and the load 60 that is to be interrupted when the receiver 54 is energized in response to the various bursts constituting the pulse groups that are transmitted by the power lines 40.

The power supply section 594 has been shown in connection with two lines 695 that are served by the secondary winding of the distribution transformer 48. These lines feed directly to the primary winding 602 of a transformer 604 having two secondary windings 606, 608. The secondary winding 606 has a pair of diodes 610 in circuit therewith plus a filter network composed of capacitors 612, 614 and a resistor 616. The diodes 610 in connection with the filter network provide a full-wave power supply. The other secondary winding 608 is connected in circuit with the relay 62 and this circuit will be better understood as the discussion of the receiver details continues.

With respect to the input section 596, attention is called to the fact that it constitutes a series resonant circuit by virtue of a capacitor 618 and a coil 620 connected across the lines 695. The coil 620 is tapped at a proper turn ratio so as to provide the right amount of impedance match. Also shown in conjunction with the input section 596 is a coupling capacitor 622 and resistor 624.

The capacitor 622 and resistor 624 form the input circuit for the combined amplifier-limiter-integrator section 598. Thus, the capacitor and resistor are connected directly to the base of a PNP transistor 626 which is normally in a non-conductive state, a pair of resistors 628 and 630 connected to the emitter of this transistor assisting in providing the proper bias for assuring a normally conductive condition. A second transistor 632 is also normally in its off condition, this being so by reason of a bias network composed of a resistor 634 and a resistor 636 connected to its emitter. More will be said later about this transistor 632. A capacitor 638, suggestively charged to minus 22 volts derived from the power supply 594, receives such a charge during the quiescent or non-conductive condition of the transistor 626. It is also to be noted that a diode 640 is connected in circuit with the capacitor 638, thereby producing a current path through the emitter-collector of the transistor 626 and also a resistor 642 connected to the collector.

What transpires when the first carrier burst comes in over the power lines 40 is that the transistor 626 is driven into a conductive state. Irrespective of the magnitude or maximum excursion of this signal, the transistor 626 will limit such an excursion, for it will chop the top of the signal off, yet if the signal is quite small, it will amplify it. The primary function of the transistor 626 is to discharge the capacitor 638 on a controlled basis. The conductive path described in the preceding paragraph functions as the discharge path when the transistor 626 is conductive because the capacitor 638 can discharge through the diode 640, the emitter-collector of the transistor 626 and the resistor 642.

Figure 20:
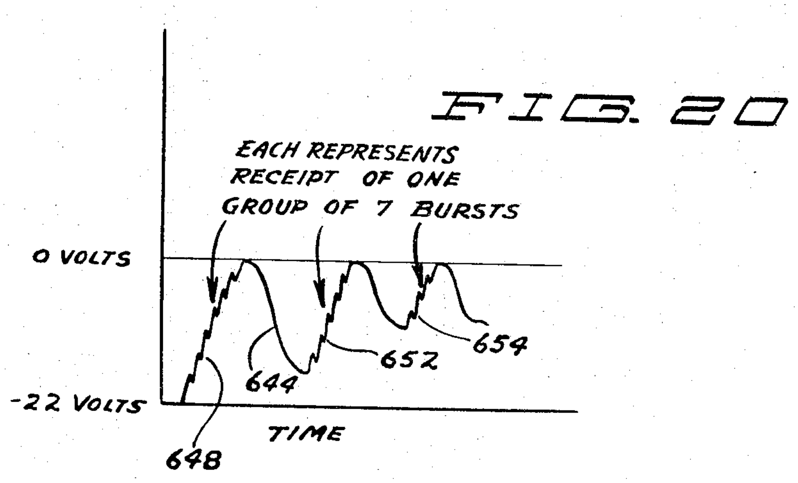
FIGURE 20 is a typical energization curve for the various receiver relays.

At this stage, it is perhaps wise to make reference to FIGURE 20 which has the voltage normally impressed across the capacitor 638 plotted against time. From the curve 644, it will be perceived that initially the capacitor is at minus 22 volts but each time that a power burst is received, the particular burst causes a discharge to a certain extent. Because the time interval between bursts is so short, the capacitor 638 does not have a chance to recharge to the minus 22 volt condition, although it tends to charge again in this direction. The charging path, of course, is through a resistor 646. Close inspection of FIGURE 20 will show that there are seven jagged steps along the leading edge of the first waveform 648 that appears in this figure. These steps merely represent the incremental discharging action that transpires. The capacitor 638 never really fully becomes discharged but it does so to a substantial extent. The reason for three waveforms 648, 650, 652 in FIGURE 20 stems from the fact that it will in most instances take three groups of power bursts before sufficient energy is imparted into the system for operating the relay 62 through an electrical circuit presently to be described. However, even when six channels are being interlaced, this represents only a period of several seconds based on the comparatively slow clock pulse rate that has been selected.

Continuing with the description, specific reference is now to be made to the second transistor 632 shown in FIGURE 19, this transistor being part of the relay puller integrator section 600. What we are interested in is sufficient current so that the coil of a relay 656 having normally open contacts 658 will be energized. Connected across the collector and emitter of this transistor is a capacitor 660. In other words, when the bias potential applied to the transistor becomes sufficiently negative due to the repeated discharging action taking place with respect to the capacitor 638, sufficient average current will flow through the coil of the relay 656, this current being assisted by the charge stored in the capacitor 660.

When the relay 656 pulls in, it closes its normally open contacts 658 and completes a circuit through the relay 62, more precisely a solenoid and generally referred to hereinbefore as a relay puller. The normally closed contacts 64 of this particular relay or solenoid are in circuit with the load 60 and opening of these contacts will of course disconnect the load from the power supply lines 40 (FIGURE 1). This is what is desired and is derived from the information contained in the command portion of the instruction word 100101011001 that was processed by the load control transmitter A. In other words, the command portion of the instruction word has called for a receiver actuation on channel 1 and this is initially accomplished.

We have also included in the command portion the requirement that channels 4 and 5, supplied by oscillators 364 and 365, have signals transmitted thereover for the purpose of operating other receivers. While in FIGURE 1 only two other sets of receivers 56, 58 have been illustrated, it will be appreciated that a number of others would be connected to the power lines 40 in the same fashion as the three sets 54, 56 and 58 that have been pictured. It may be considered that continued operation will energize the receivers 56 and 58 with discrete power bursts from the oscillators 364 and 365, respectively. The carrier bursts on the frequency that operated the receivers 54 will be repeated after an elapse of time in which the receivers 56 and 58 controlled by channels 4 and 5, that is, by oscillators 364 and 365, have been actuated. This is the interlacing feature that was earlier alluded to.

*Transformer characteristics*

Figures 21, 22, 23:
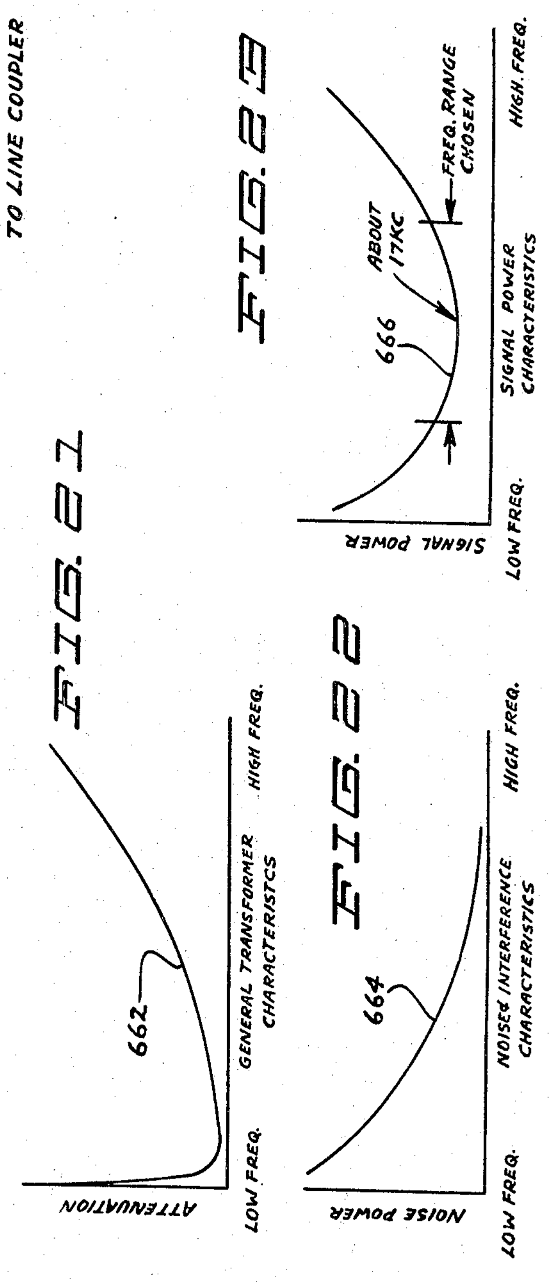
FIGURE 21 is a characteristic curve of a typical distribution transformer with attenuation plotted against frequency.
FIGURE 22 presents a curve for the purpose of showing in a general way the noise and interference characteristics that might be expected, the noise power being plotted against frequency.
FIGURE 23 is another curve showing signal power characteristics, the signal power being plotted against frequency and an indication being made as to the relative optimum frequency range for the signals to be transmitted.

As an aid to those confronted with the designing of a workable load control system, typical transformer characteristics have been pictorially represented in FIGURE 21. From this figure it will be seen that considerable attenuation occurs at very low frequencies and that an optimum point is present on the curve 662 which is still at a relatively low frequency value, being in the neighborhood of 60 c.p.s., the attenuation thereafter increasing with frequency. In conjunction with FIGURE 21, FIGURE 22 should be studied also, for this figure presents graphically the noise interference characteristic that must be contended with. Here, the noise, as indicated by the curve 664, is greatest at the lower or power frequency end of the frequency spectrum. Therefore, it is believed evident that an optimum range of frequencies for the possible carrier frequencies lies generally at the lowest portion of the frequency curve 666 illustrated in FIGURE 23 which has been found to be somewhere around the previously mentioned 17 kc. Stated somewhat differently, the power requirements for transmission over the power distribution lines will be at a minimum if proper consideration is given to both the transformer characteristics and also the noise conditions that are apt to be present in a given situation. With respect to the power needed, it will be recalled that about 900–1200 watts will be adequate, it having been stated earlier that each amplifier 38 should put out about 300–400 watts per phase.

*Summary of system operation*

Inasmuch as a rather comprehensive operational description has been offered as the description of components was made, only a general or summary type of operation is believed desirable at this time. The instructions to be carried out are prepared at the terminal equipment or remote control unit 30 and are coded in digital form. The word that has been selected for use is the binary word 100101011001. The first digit of this word represents the master bit; the next five digits the address portion of the word, and the six digits at the right the command portion. This word, in the illustrated situation, is transmitted from the terminal equipment 30 from information derived from a punched tape, magnetic tape, or other appropriate apparatus, via the communication line 32, to the various receivers 118 located at the different load control transmitter units A, B and C (and others not shown). The load control transmitter units would usually be situated at various substations.

The modulated carrier bursts containing the sync pulses and word information, as displayed in FIGURE 3, are demodulated at all of the receivers 118 (not to be confused with the receivers 54, 56 and 58 at the load end of the power distribution lines 40) that are tied in to the particular communication line 32, there being one such receiver 118 at each transmitter. The information after initial processing by the receiver 118 of FIGURE 4*a* is in the form of minus 5 volt pulses or spikes, the time orientation of FIGURE 3 still being retained. These D-C pulses are serially forwarded to the 12-bit input register 88, the sync pulses that precede each bit constituting part of the instruction word conditioning the input conrol 66 and also causing a left shift operation to take place with respect to the input register 88. When the input register 88 is filled, then the word 100101011001 is contained in this register. The master bit portion of the input register 88, this being the one at the left of the register, performs certain operations. Likewise, the address portion of the word is checked as to whether this particular transmitter A receiving the information from the terminal equipment 30 should be placed in transmitting operation. Still further, the six-bit command portion of the word is transferred via the command transfer gates 94 to the six-bit command register 96.

The three-bit command counter 104 associated with the six-bit command register 96 is caused to count and a coincident count with the bit information stored in the six-bit command register 96 will cause seven pulses to be generated by the pulse generator 114. Such action literally turns on the exciter seven times.

Thus, seven bursts having the proper carrier frequency are forwarded onto the power distribution lines 40, and the particular receivers 54 which are tuned to this frequency will be actuated so as to disconnect their controlled loads 60.

Carrier frequencies of different values, there being a different frequency for each of the six channels, although only three channels are actually used in the illustrated case, are interlaced with each other. In other words, the oscillator 361 is first used to provide one requisite carrier frequency of 12 kc. and seven pulses in the form of seven discrete power bursts at this particular frequency are delivered from the amplifiers 38 due to the energization of the three-phase exciter 36 derived from the triggering action of the pulse generator 114. This is all caused by the first coincident condition occurring between the three-bit command counter 104 and the six-bit command register 96 through the agency of the command translator 106.

After the discrete command signals in the form of seven power bursts are provided on channel 1, which takes place via the coils **44*a* and capacitors 46*a*** (FIGURE 4*d*), then the three-bit command counter seeks another coincident condition which will cause channel 4, which includes the coils **44*d* and capacitors 46*d*, to be supplied with the appropriate carrier frequency from the oscillator 364. After seven power bursts at the new carrier frequency that is, at 18 kc., are sent out onto the distribution lines 40 for receipt by those receivers tuned to the carrier frequency of channel 4, say, the receivers 56, then channel 5, which includes the coils 44*e* and capacitors 46*e***, becomes operative in the same manner and power bursts at 20 kc. are transmitted.

After sending the discrete information signals onto the power lines 40 from channel 5, then channel 1 is again utilized for the forwarding of seven more bursts at the frequency of the oscillator 361. The bursts containing the carrier frequency assigned to channel 1 will be received before the three capacitors 638 (see FIGURE 19 for one such capacitor) associated with the three receivers 54 have had a chance to become recharged to their minus 22-volt state. Hence, the now disconnected loads 60 associated with the receivers 54 will not be reconnected.

The interlacing keeps repeating itself over and over until a new command word is sent from the terminal equipment 30 so as to dictate a different course of action. As previously indicated, if the transmitter A is to be inactivated, then the instruction word 100101000000 will be forwarded from the terminal equipment 30 via the communication line 32 and will be processed just as any other word. However, when the command portion 000000 is transferred into the six bit command register 96, the no command translator 98 will take cognizance of the fact and all of the flip-flops in the transmitter A will be cleared to their 0 or reset state.

While power companies will naturally wish to determine their own priority schedules as to the classes of loads to be dropped, it can be assumed that the receivers 54 will disconnect certain water heaters, the receivers 56 certain home heating loads and the receivers 58 certain refrigerating loads. These classes would be controlled by what has been termed channels 1, 4 and 5. Channel 2 might be reserved for the dropping of certain air conditioning loads, channel 3 for the disconnection of certain industrial loads, and channel 6 for specified types of office loads such as escalators. Additional channels can be provided for disconnecting still other types of loads, the six channels being only exemplary. The point to be appreciated is that a control system is provided when practicing the teachings of the instant invention that is discriminating in its operation, and that all loads on a power distribution system do not have to be dropped as would occur if a disconnection were made at the substation itself. Consequently, there does not have to be an interruption of power supplied to loads of an essential nature which cannot be dropped without incurring inconvenience, loss of valuable business or manufacturing time, or loss of customer goodwill. Not only can the overall load that is connected to a power distribution system be controlled by dropping specified load classes, but continued control is available by allowing the loads to be reconnected on a selective and gradual basis. Hence, true system stability can be economically achieved with a minimum amount of equipment.

It will, of course, be understood that various changes may be made in the form, details, arrangements and proportions of the parts without departing from the scope of our invention as set forth in the appended claims.

What is claimed:

1. A load control system comprising:
(a) a power line;
(b) a plurality of oscillators for supplying carrier signals of different frequencies to said power line;
(c) a relay means associated with each oscillator;
(d) means interposed between said various relay means and said power line for connecting each relay means to said power line so as to apply a carrier signal to said line having the frequency of the oscillator with which the particular relay means that is then connected is associated;
(e) means for triggering said last-mentioned means into operation a prescribed number of times so as to interruptedly apply that carrier signal to said line and thereby provide a series of pulses for transmission along said line;
(f) means for preselecting the sequence said relay means are to be energized;
(g) means connected to said determining means for starting said triggering means each time a relay means is energized;
(h) means connected to said triggering means for causing the next selected relay means to be energized after completion of the preceding prescribed number of triggering times, and
(i) means responsive to receipt of said transmitted pulses at remote points along said power line for removing loads connected to said power line in accordance with the particular carrier frequencies of said pulses and in accordance with the number of such pulses having said particular frequencies.

2. A load control system comprising:
(a) a power line;
(b) a plurality of oscillators for supplying carrier signals of different frequencies;
(c) a command register for storing information as to which oscillators are to be connected to said power line;
(d) counting means;
(e) means for conditioning the appropriate oscillator for connection to the lower line when there is a coincident relationship between said counting means and said command register;
(f) means for connecting said last-mentioned means to said power line, said connecting means normally disconnecting said last-mentioned means;
(g) means for triggering said connecting means into operation each time a coincident relationship is reached between said counting means and said command register to transmit a power burst each time a connection is completed, and
(h) a plurality of receivers located at a distance from said oscillators, each being tuned to one of said frequencies and activated by receipt of power bursts containing the frequency to which it is tuned for integrating said power bursts and causing a disconnection of a given load after a particular integration has taken place.

3. A load control system as characterized in claim 2 in which:
(a) said command register includes a plurality of binary stages and said system further comprises
(b) means for terminating the transmission of power bursts when the stages of said command register have all been set to their zero state.

4. A load control system comprising:
(a) a power line;
(b) respective means for generating a plurality of carrier signals of different frequencies;
(c) a modulator pulse generator for producing an output pulse each time it is triggered;
(d) means responsive to the operation of each of said respective carrier signal generating means for triggering said pulse generator a prescribed number of times;
(e) an exciter connected to said signal generating means and to said pulse generator for passing a carrier signal each time said pulse generator produces an output pulse to forward a power burst to said power line containing the frequency of one of said respective generating means;
(f) means for selecting which one of said carrier signal generating means is to be operative at any given time, and
(g) a plurality of receivers connected to said power line, each being responsive to a particular carrier signal frequency and including means energized by the continued receipt of pulses having said particular frequency for effecting a load reduction function.

5. A load control system comprising:
(a) a power line;
(b) a plurality of individual circuits, each being capable of supplying said power line with a carrier signal of a different frequency;
(c) means for repeatedly connecting any one of said circuits to the power line to provide a group of successive power bursts for the frequency of that circuit;
(d) an input register having a command portion and a master bit portion;
(e) means for serially feeding a binary instruction word into said input register, said instruction word containing a master bit and a prescribed number of command bits;
(f) a second register devoted solely to the storing of information transferred from the command portion of the input register;
(g) means for causing transfer of the content of the command portion of said input register to said second register when a master bit of a certain value appears in the master bit portion of said input register;
(h) means responsive to the content of said second register for connecting the appropriate one of said circuits to said power line in the order called for by said second register;
(i) means for activating said connecting means each time one of said circuits is connected to said power line so as to cause successive power bursts of the frequency of said one circuit to be superimposed on said power line, and
(j) a plurality of receivers, each including means for demodulating said power bursts and deriving a control signal therefrom for use in causing a particular load to be disconnected from said power line.

6. A load control system as characterized in claim 5 including:
(a) means associated with said input register and said second register for clearing said input register when no information is transferred to said second register during a transfer operation.

7. A load control system comprising:
(a) a power line;
(b) a plurality of individual circuits each being capable of supplying said power line with a carrier signal of a different frequency;
(c) an input register having a master bit portion, an address portion and a command portion;
(d) means for serially feeding a binary instruction word into said input register containing a master bit, an address portion and a command portion;
(e) a command register for storing command information taken from said input register;
(f) gate means connected between the command portion of said input register and said command register for transferring the content of said command portion to said command register;
(g) means controlled by the arrival of the master bit into said master bit portion of the input register for opening said gate means to effect said transfer of information to said command register;
(h) means controlled by the content of said command register for providing successive groups of power bursts;
(i) a plurality of loads connected to said power line, and
(j) a receiver associated with each load for causing disconnection of its load from said line upon receipt of a sufficient number of power bursts having a particular carrier frequency, each of said receivers being tuned to a different one of said carrier signal frequencies.

8. A load control system comprising:
(a) a power line;
(b) a plurality of individual oscillator circuits, each being capable of supplying said power line a carrier signal of different frequency;
(c) an input register including a master bit stage, a plurality of address stages and a plurality of command stages, said master bit stage constituting the highest order stage;
(d) means for feeding a binary instruction word bit by bit into the lowest order stage, said word including a master bit, an address portion and a command portion;
(e) means for causing each bit to be successively shifted toward said master bit stage;
(f) address means;
(g) a command register;
(h) normally closed gate means connecting the command stages of said input register to said command register;
(i) means for comparing the content of the address stages of said input register with the address contained in said address means to produce a triggering signal only if there is a correspondence to thereby cause said gate means to open and thus transfer the command information contained in the command stages of said input register to said command register;
(j) means controlled by the content of said command register for connecting certain of said oscillator circuits to said power line to form groups of power bursts of said different frequencies, those circuits so selected being in accordance with the information contained in the command portion of said instruction word;
(k) a plurality of loads connected to said power line, and
(l) a receiver associated with each of said loads which is responsive to a particular one of said carrier signal frequencies for disconnecting its associated load upon receipt of a sufficient number of power bursts via said power line.

9. A load control system as characterized in claim 8 in which:
(a) said address means includes a bank of individually selected switches.

10. A load control system comprising:
(a) a power line;
(b) a plurality of individual oscillator circuits, each being capable of supplying said power line a carrier signal having a different frequency;
(c) an input register including a master bit stage and a plurality of command stages, said master bit stage constituting the last stage thereof;
(d) input control circuitry for processing pulses obtained from an instruction word, said pulses constituting a sync pulse followed by a master bit pulse and additional sync pulses, each of said sync pulses being followed by a command pulse representing either a binary one or zero depending upon its time displacement with respect to its preceding sync pulse, said input control circuitry including means responsive to said sync pulses for conditioning said input register for acceptance of said master bit pulse and said command pulses into its first stage;
(e) means responsive to each sync pulse for producing a shift operation of said input register from stage to stage whereby said master bit is placed in said last stage when the input register becomes full;
(f) means for successively connecting a given oscillator circuit to said power line a predetermined number of times;
(g) means responsive to the information contained in said command stages for selecting certain of said oscillator circuits in accordance with the instructions denoted by said command pulse to constitute at any one time said given oscillator circuit mentioned above;
(h) means controlled by said last stage for activating said last-mentioned means only when said master bit has been placed in said last stage;
(i) a plurality of loads connected to said power line, and
(j) a plurality of receivers associated with said loads, each receiver being tuned to a particular carrier signal frequency and capable of disconnecting the load with which it is assocated upon receipt of a sufficient number of pulses having said particular carrier frequency contained therein.

11. A load control system as characterized in claim 10 in which:
(a) said input register includes a plurality of address stages and said system includes
(b) address means, and
(c) means for checking the content of the address stages of said input register against the address called for by said address means for causing operation of said activating means only when there is a correspondence of addresses.

12. A load control system as characterized in claim 10 including:
(a) means for clearing said input register, and
(b) means responsive to continued processing of said sync pulses for preventing operation of said clearing means.

13. A load control system as characterized in claim 10 in which:
(a) said input control circuitry includes means for preventing the processing of two sync pulses without a command pulse coming in between.

14. A load control system as characterized in claim 10 in which:
(a) said input control circuitry includes means for clearing said input register if a sync pulse is not followed by a pulse representing either a one or zero.

15. A load control system as characterized in claim 10 in which:
(a) said input control circuitry includes means for clearing said input register if a sync pulse is followed by two pulses representing a one and a zero.

16. A load control system as characterized in claim 10 in which:
(a) said input control circuitry includes respective means for preventing a registration of a second pulse representing either a second one or a second zero within the same time interval between two sync pulses.

17. A load control system comprising:
(a) a power line;
(b) an input register including a master bit stage, a plurality of address stages and a plurality of command stages;
(c) means for serially supplying a plurality of sync pulses, the first sync pulse being followed by a master bit pulse having a particular time relationship with said first sync pulse so as to represent a certain binary value and the remaining sync pulses being followed by address and command pulses having particular time relationships with their respective sync pulses so as to represent an address portion of a binary word and a command portion thereof;
(d) means connected between said last-mentioned means and said input register for serially feeding said time pulses to the first stage of said input register only after determination that a sync pulse has first been supplied;
(e) means responsive to said sync pulses for shifting the content of the input register in a stage by stage manner toward said master bit stage;
(f) a plurality of address select switches;
(g) means controlled by said master bit stage for checking the correspondence between said address select switches and the address stages of said input register;
(h) a command register;
(i) a plurality of transfer gates connected between said command register and the command stages of said input register;
(j) means operated by said correspondence checking means for opening said command transfer gates to transfer the content of the command stages of said input register to said command register upon a determination that a correspondence exists between the address select switches and the address stages of said input register;
(k) a plurality of individual circuits, each being capable of supplying said power line with a carrier signal having a different frequency;
(l) a ring counter;
(m) A command translator for selectively energizing certain of said carrier signal circuits each time a coincident relationship is established between said ring counter and said command register as said counter counts;
(n) means operated by said command translator each time a coincident relationship is established to forward a series of pulses of the carrier frequency then being supply to said power line to produce a sequence of power bursts for transmission via said power line;
(o) a plurality of loads connected to said power line, and
(p) a receiver associated with each load, each receiver being responsive to a particular carrier frequency for causing disconnection of its associated load during receipt of power bursts of that particular carrier frequency and including means for delaying reconnection of said load for a predetermined time after cessation of power bursts of said particular frequency.

18. A load control system as characterized in claim 17 in which said pulse forwarding means includes:
(a) a modulator pulse generator;
(b) a supply of clock pulses for triggering said pulse generator into operation each time a clock pulse arrives;
(c) a counter for counting said clock pulses, and
(d) means for stopping said counter after a certain number of clock pulses have caused triggering of said pulse generator a desired number of times to produce said series of pulses.

19. A load control system as characterized in claim 18 including:
(a) a no command translator connected to said master bit stage and to said command register for stopping said first counter when the content of said command register is zero.

20. A load control system comprising:
(a) a power line;
(b) means for transmitting a series of pulses along said power line;
(c) means located at a distance from said transmitting means for receiving said pulses, said receiving means being activated by receipt of a sufficient number of pulses from said power line;
(d) a load connected to said power line;
(e) means operated by said receiving means when said receiving means is activated for disconnecting said load from the power line, and
(f) said receiving means being normally inactive and returning to its inactive condition when further pulses are no longer received.

21. A load control system comprising:
(a) a power line;
(b) a transmitter for sending pulses over said power line;
(c) a receiver located at a distance from said transmitter including a first circuit having a capacitor normally charged to one condition and discharged to a new condition each time a pulse is received;
(d) a load normally connected to said power line;
(e) means responsive to a sufficiently discharged condition of said capacitor for causing disconnection of said load, and
(f) said receiver including means tending to recharge said capacitor to its said one condition whereby said capacitor becomes recharged when pulses are not received for a given interval of time.

22. A load control system as characterized in claim 21 in which:
(a) said pulses are in the form of alternating current power bursts, and
(b) said first circuit includes means responsive to the frequency of said power bursts and means for rectifying said bursts to provide direct current pulses for said capacitor in accordance with the number of power bursts that are received.

23. A load control system comprising:
(a) a power line;
(b) a plurality of oscillators for supplying carrier signals of different frequencies to said power line;
(c) respective means for connecting said oscillators to said power line;
(d) control means for determining which of said connecting means is to be made operative and hence which oscillator is to be utilized;
(e) means for providing a series of pulses having the oscillator frequency contained therein supplied by the particular oscillator then being utilized;
(f) means controlled by said control means for triggering said pulse providing means into operation each time one of said oscillator connecting means is made operative;
(g) means for superimposing each series of pulses from said pulse providing means onto the power line to provide power bursts for transmission along said power line;
(h) a plurality of receivers located at a distance from said oscillators, each being tuned to a given carrier frequency and responsive to power bursts having such a carrier frequency therein for causing disconnection from said power line a load controlled by the receiver that has been made responsive, and
(i) said control means including a command register for storing information pertaining to the particular oscillators to be used and means for repeatedly interrogating such register as to cause the appropriate connecting means to connect the desired oscillator to said power line.

24. A load control system as characterized in claim 23 including:
(a) means for preventing transmission of power bursts when no information is contained in said command register.

25. A load control system comprising:
(a) a power line;
(b) a plurality of individual circuits, each being capable of supplying said power line a carrier signal having a different frequency;

(c) means for making available certain of said circuits to said power line in a desired sequence which is continually repeated;

(d) a modulator pulse generator for causing connection of the then available circuit each time said generator is triggered into operation to provide a power burst for transmission via said power line;

(e) means for triggering said pulse generator into operation a predetermined number of times each time one of said circuits is connected to said power line;

(f) a plurality of loads connected to said power line;

(g) a receiver associated with each load, each receiver being responsive to the transmitted power bursts having a particular carrier frequency contained therein, and (h) means for preventing further connection of said circuits to said power line upon receipt of a certain command signal.

26. A load control system comprising:

(a) a power line;

(b) a plurality of individual circuits, each being capable of supplying said power line a carrier signal having a different frequency;

(c) means for making available certain of said circuits to said power line in a desired sequence;

(d) a modulator pulse generator for causing connection of the then available circuit each time said generator is triggered into operation to provide a power burst for transmission via said power line;

(e) means for triggering said pulse generator into operation a predetermined number of times each time one of said circuits is connected to said power line;

(f) a plurality of loads connected to said power line;

(g) a receiver associated with each load, each receiver being responsive to the transmitted power bursts having a particular carrier frequency contained therein, and (h) said triggering means including a source of clock pulses and a counter for counting said clock pulses to cause triggering of said pulse generator said predetermined number of times.

References Cited

UNITED STATES PATENTS

| | | | |
|---|---|---|---|
| 3,002,146 | 9/1961 | Lorrig et al. ------ | 340—163 X |
| 3,200,380 | 8/1965 | MacDonald et al. -- | 340—172.5 |

OTHER REFERENCES

Automatic Control staff report, Analog and Digital Techniques Control Electric Power System, Automatic Control, January 1962, pages 37 to 43.

MALCOLM A. MORRISON, *Primary Examiner.*

MARTIN P. HARTMAN, *Examiner.*

K. W. DOBYNS, *Assistant Examiner.*

UNITED STATES PATENT OFFICE
CERTIFICATE OF CORRECTION

Patent No. 3,359,551 December 19, 1967

Richard L. Dennison

It is hereby certified that error appears in the above numbered patent requiring correction and that the said Letters Patent should read as corrected below.

Column 1, line 56, "it" should read -- is --. Column 4, line 73, after "c," insert -- d, --. Column 5, line 68, "has" should read -- have --. Column 6, line 49, "which" should read -- what --. Column 7, line 43, "lock-up" should read -- lock-out --. Column 8, line 33, "rescept" should read -- respect --. Column 13, line 13, "synch" should read -- sync --. Column 14, lines 48 and 50, "puse", each occurrence, should read -- pulse --. Column 15, line 2, "this" should read -- the --. Column 19, line 41, "contain", first occurrence, should read -- contains --. Column 23, line 41, "pri-" should read -- pro- --. Column 24, lines 3 to 7, cancel "should be readily apparent also. Briefly, it can be stated that the #1 auto clear flip-flop circuit 84 clears all of the flip-flops located on Figures 4a and 4b, whereas the clearing operation of the #2 auto clear flip-flop circuit 86". Column 25, line 52, cancel "in", second occurrence. Column 28, line 46, "connected" should read -- connection --. Column 35, line 46, "conrol" should read -- control --. Column 37, line 44, "lower" should read -- power --. Column 40, line 25, "assocated" should read -- associated --.

Signed and sealed this 16th day of September 1969.

(SEAL)
Attest:

EDWARD M.FLETCHER,JR.
Attesting Officer

WILLIAM E. SCHUYLER, JR.
Commissioner of Patents